(12) United States Patent
Matsuoka

(10) Patent No.: US 6,286,648 B1
(45) Date of Patent: Sep. 11, 2001

(54) LOCKUP DEVICE OF A TORQUE CONVERTER

(75) Inventor: Yoshihiro Matsuoka, Neyagawa (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/493,152

(22) Filed: Jan. 28, 2000

(30) Foreign Application Priority Data

Feb. 9, 1999 (JP) ................................................. 11-031720

(51) Int. Cl.$^7$ .................................................. F16H 45/02
(52) U.S. Cl. ............................................................ 192/3.29
(58) Field of Search .................................. 192/3.29, 3.3

(56) References Cited

U.S. PATENT DOCUMENTS

| 4,919,241 | * | 4/1990 | Koshimo | 192/3.29 |
|---|---|---|---|---|
| 4,951,788 | | 8/1990 | Martin . | |
| 5,337,867 | * | 8/1994 | Kirkwood | 192/3.29 |
| 5,586,434 | | 12/1996 | Okubo et al. | 60/345 |
| 5,669,475 | | 9/1997 | Matsuoka | 192/3.29 |
| 5,695,028 | | 12/1997 | Fukushima | 192/3.27 |
| 5,918,713 | | 7/1999 | Shimizu et al. | 192/3.29 |
| 5,964,329 | | 10/1999 | Kawaguchi et al. | 192/3.3 |
| 6,053,292 | * | 4/2000 | Macdonald | 192/3.3 X |
| 6,193,037 | * | 2/2001 | Middelmann et al. | 192/3.29 |

FOREIGN PATENT DOCUMENTS

| 33 45 980 A1 | 5/1985 | (DE) . |
|---|---|---|
| 37 22 860 A1 | 2/1988 | (DE) . |
| 195 08 458 A1 | 9/1995 | (DE) . |
| 195 09 501 A1 | 9/1996 | (DE) . |
| 195 36 952 A1 | 4/1997 | (DE) . |
| 197 22 150 A1 | 12/1997 | (DE) . |
| WO99-08 022 | 2/1999 | (WO) . |

* cited by examiner

Primary Examiner—Rodney H. Bonck
(74) Attorney, Agent, or Firm—Shinjyu Global IP Counselors, LLP

(57) ABSTRACT

A lockup device 4 of a torque converter 1 is provided with a damper mechanism 44, which is axially movable together with a piston. Particularly, the lockup device 4 of a torque converter 1 is provided with a simplified structure that reduces production costs. The lockup device of a torque converter basically includes a clutch coupling portion and a damper mechanism 44. The damper mechanism 44 has a plurality of first claw portions 61, a drive member 50, a driven member 51, a plurality of torsion springs 52 and a first piston 43. The first claw portions 61 are fixedly coupled to the turbine 11. The driven member 51 has a plurality of second claw portions 59 that are axially movably and non-rotatably engaged with the first claw portions 61. The drive member 50 radially positions the driven member 51.

36 Claims, 10 Drawing Sheets

US 6,286,648 B1

LOCKUP DEVICE OF A TORQUE CONVERTER

BACKGROUND OF THE INVENTION

1. Field of the Invention

This invention generally relates to a lockup device of a torque converter. More specifically, the present invention relates to a lockup device provided with a damper mechanism that is axially movable together with a piston.

2. Background Information

Torque converters usually include a fluid coupling mechanism for transmitting torque between the crankshaft of an engine and the input shaft of an automatic transmission. In recent years, to improve fuel efficiency, some torque converters have included lock-up devices that, upon reaching predetermined operating conditions, lock-up the torque converters so that power from the crankshaft of an engine is directly transmitted to the automatic transmission, bypassing the fluid coupling device. Upon engagement, lock-up devices often cause a shudder, or vibration. Further, while engaged, the lock-up device is subject to vibrations caused by sudden acceleration, or deceleration, or other vibration including circumstances associated with internal combustion engines. Consequently, a torsional vibration dampening apparatus is typically employed in lock-up device to dampen vibration.

A torque converter has three types of runners (impeller, turbine, stator) located inside for transmitting the torque by means of an internal hydraulic oil or fluid. The impeller is fixedly coupled to the front cover that receives the input torque from the power input shaft. The hydraulic chamber formed by the impeller shell and the front cover is filled with hydraulic oil. The turbine is disposed opposite the front cover in the hydraulic chamber. When the impeller rotates, the hydraulic oil flows from the impeller to the turbine, and the turbine rotates. As a result, the torque is transmitted from the turbine to the main drive shaft of the transmission.

The lock-up clutch is disposed in the space between the front cover and the turbine. As mentioned above, the lock-up clutch is a mechanism to directly transmit the torque between the crankshaft of the engine and the drive shaft of the transmission by mechanically coupling the front cover and the turbine. The lock-up clutch includes primarily a piston and a damper mechanism to connect the piston to the members on the power output side of the turbine. The piston is disposed to divide the space between the front cover and the turbine into a first hydraulic chamber on the front cover side and a second hydraulic chamber on the turbine side. As a result, the piston can move close to and away from the front cover by the pressure difference between the first hydraulic chamber and the second hydraulic chamber. When the hydraulic oil in the first hydraulic chamber is drained and the hydraulic pressure in the second hydraulic chamber increases in pressure, the piston moves toward the front cover side. This movement of the piston causes the piston to strongly press against the front cover.

The damper mechanism of a conventional lockup device includes a drive member fixedly coupled to the piston, a driven member fixedly coupled to the turbine side, and an elastic member (one or more torsion springs) disposed in between the drive member and the driven member to enable torque transmission. The damper mechanism functions as a torsional vibration dampening mechanism to dampen vibration in the lock-up clutch. The drive member is supplied with a torque, e.g., from a clutch coupling portion. The driven member can output the torque to a turbine. The torsion springs elastically couple the drive member and the driven member together in the rotating direction to form a damping mechanism. The damper mechanism is axially movable and acts as a piston of the lockup device. More specifically, the inner peripheral surface of the driven member is non-rotatably engaged with a splined turbine hub for preventing relative rotation and allowing axial movement. As a result, the driven member is non-rotatable and axially movable with respect to the splined turbine hub. The driven member is radially positioned with respect to the turbine hub.

In the conventional lockup device described above, providing the splines on the turbine hub increases the working or machining cost of producing a turbine hub and/or a mating driven member.

In view of the above, there exists a need for a lockup device of a torque converter which overcomes the above mentioned problems in the prior art. This invention addresses this need in the prior art as well as other needs, which will become apparent to those skilled in the art from this disclosure.

SUMMARY OF THE INVENTION

An object of the present invention is to provide a lockup device with a damper mechanism that can axially move together with a piston.

Another object of the present invention is to provide a lockup device that has a simple structure.

A further object of the present invention is to provide a lockup device that is relatively less expensive to produce and thus reduces machining costs.

According to a first aspect of the present invention, a lockup device of a torque converter includes a plate, a piston and a damper mechanism. The plate is disposed near a front cover friction surface. The piston is disposed on the side of the plate remote from the front cover friction surface, and can push the plate toward the front cover friction surface in accordance with changes in pressure in a space. The damper mechanism has a drive member, a driven member and a torsion spring. First and second engagement portions are provided that are axially movably and non-rotatably engaged with one another so the damper mechanism rotates together with the turbine. The drive member receives a torque from the plate. The driven member has one of the first and second engagement portions and a supported portion radially supported within the torque converter. The torsion spring elastically couples the drive member and the driven member together in the rotating direction.

According to the lockup device of the torque converter in accordance with the first aspect of the present invention, the driven member is divided into the portion for torque transmission and the portion for radial support. Therefore, it is not necessary to machine or work the turbine hub for forming the splines. As a result, the structure can be simple, and the working cost can be reduced.

In accordance with a second aspect of the present invention, the lockup device of the torque converter has a first engagement portion that is formed of a plurality of first claw portions, and the second engagement portion is formed of a plurality of second claw portions.

In accordance with a third aspect of the present invention, the lockup device of the torque converter in accordance with the first aspect of the present invention further has such a feature that the first engagement portion is integrally formed with a turbine shell of the turbine.

In accordance with a fourth aspect of the present invention, the lockup device of the torque converter in accordance with the first aspect of the present invention further has such a feature that the supported portion of the driven member is radially supported by the drive member.

In accordance with a fifth aspect of the present invention, the lockup device of the torque converter in accordance with the first aspect of the present invention further has such a feature that the supported portion of the driven member is radially supported by a portion of the turbine.

In accordance with a sixth aspect of the present invention, the lockup device of the torque converter in accordance with the first aspect of the present invention further has such a feature that the supported portion of the driven member is radially supported by the plate.

In accordance with a seventh aspect of the present invention, the lockup device of the torque converter in accordance with the second aspect of the present invention further has such a feature that the supported portion of the driven member is radially supported by the plurality of first claw portions.

In accordance with the present invention, a torque converter is provided that is adapted to be used to transmit torque from a power input shaft to an output shaft. The torque converter comprising a front cover, an impeller, a turbine, a stator and a lockup device. The front cover is adapted to be coupled to the power input shaft. The front cover is provided at an inner side with a friction surface. The impeller is connected to the front cover to form a hydraulic chamber together with the front cover. The turbine is disposed opposite the impeller and disposed inside the hydraulic chamber. The turbine is adapted to be coupled to the output shaft. The stator is disposed between the impeller and the turbine. The front cover and the turbine forming a space therebetween with the lockup device disposed in the space. The lockup device mechanically engages and disengages the front cover with respect to the turbine. The lockup device is constructed as mentioned above in accordance with the seven previously mentioned aspects of the invention.

These and other objects, features, aspects and advantages of the present invention will become readily apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
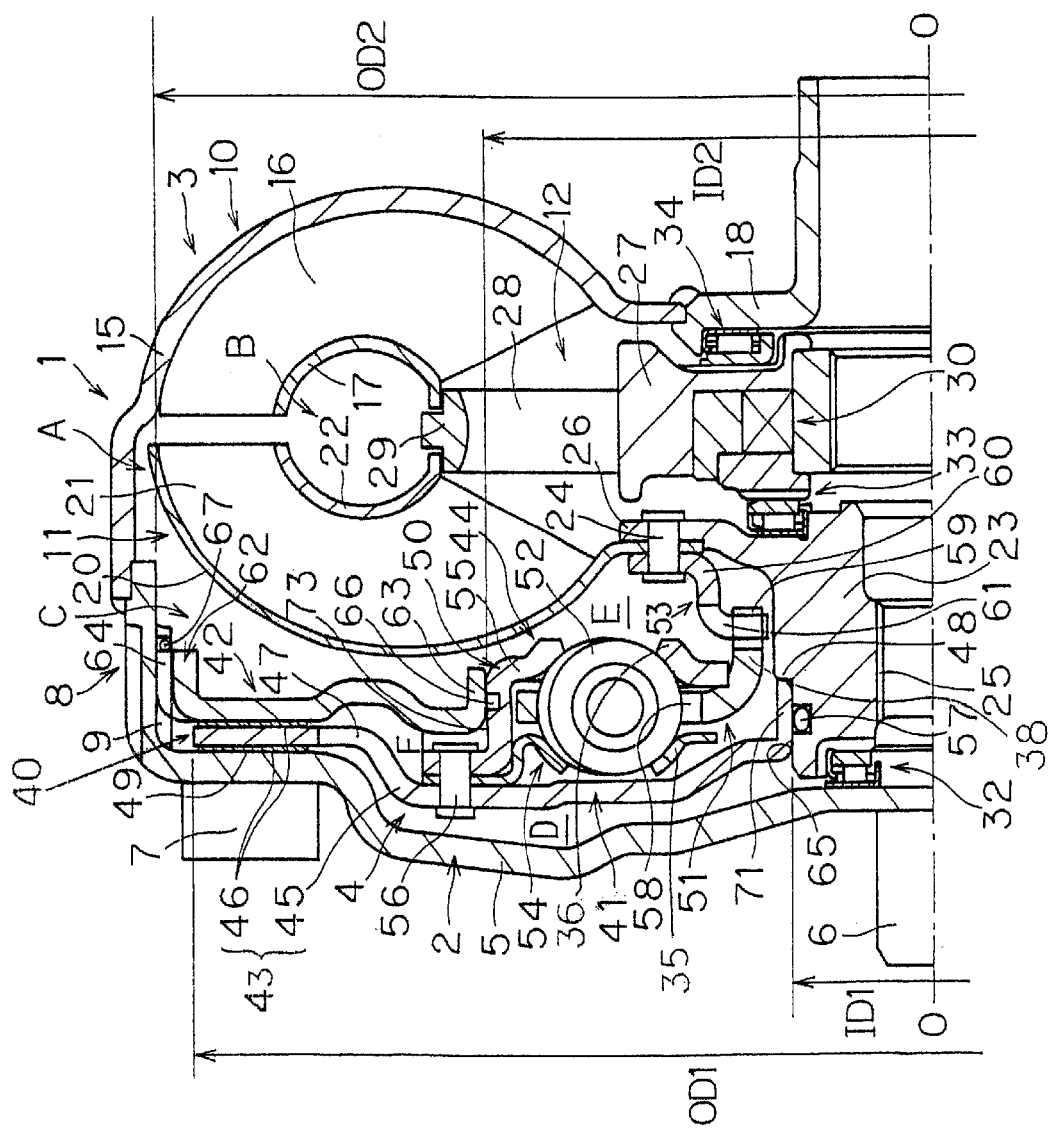
FIG. 1 is a schematic cross sectional view of an upper half of a torque converter with a lockup device having a damper mechanism in accordance with a first embodiment of the invention.
Figure 2:
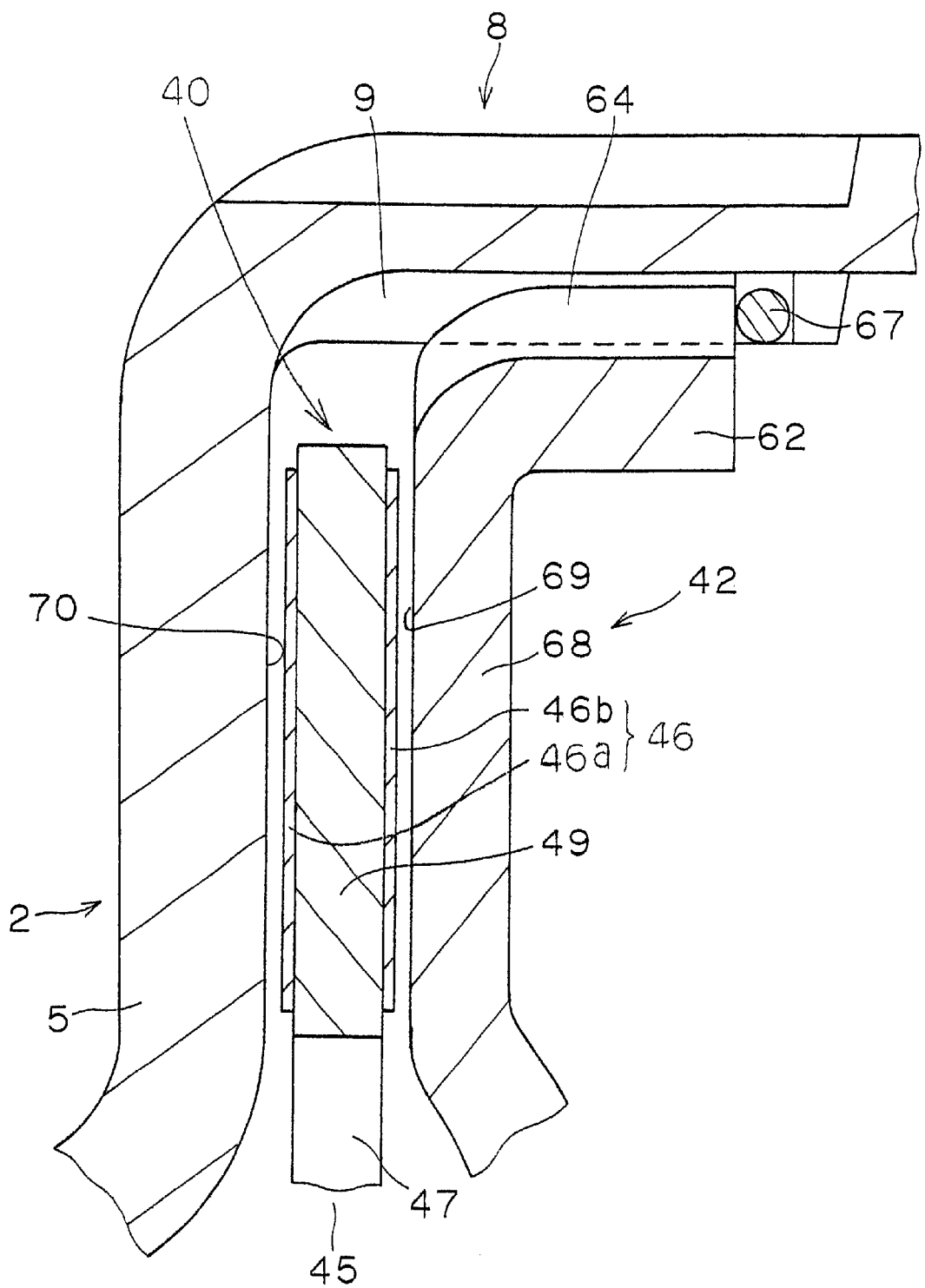
FIG. 2 is an enlarged, partial cross sectional view of a clutch coupling portion of the lockup device illustrated in FIG. 1 in accordance with the first embodiment of the invention.
Figure 3:
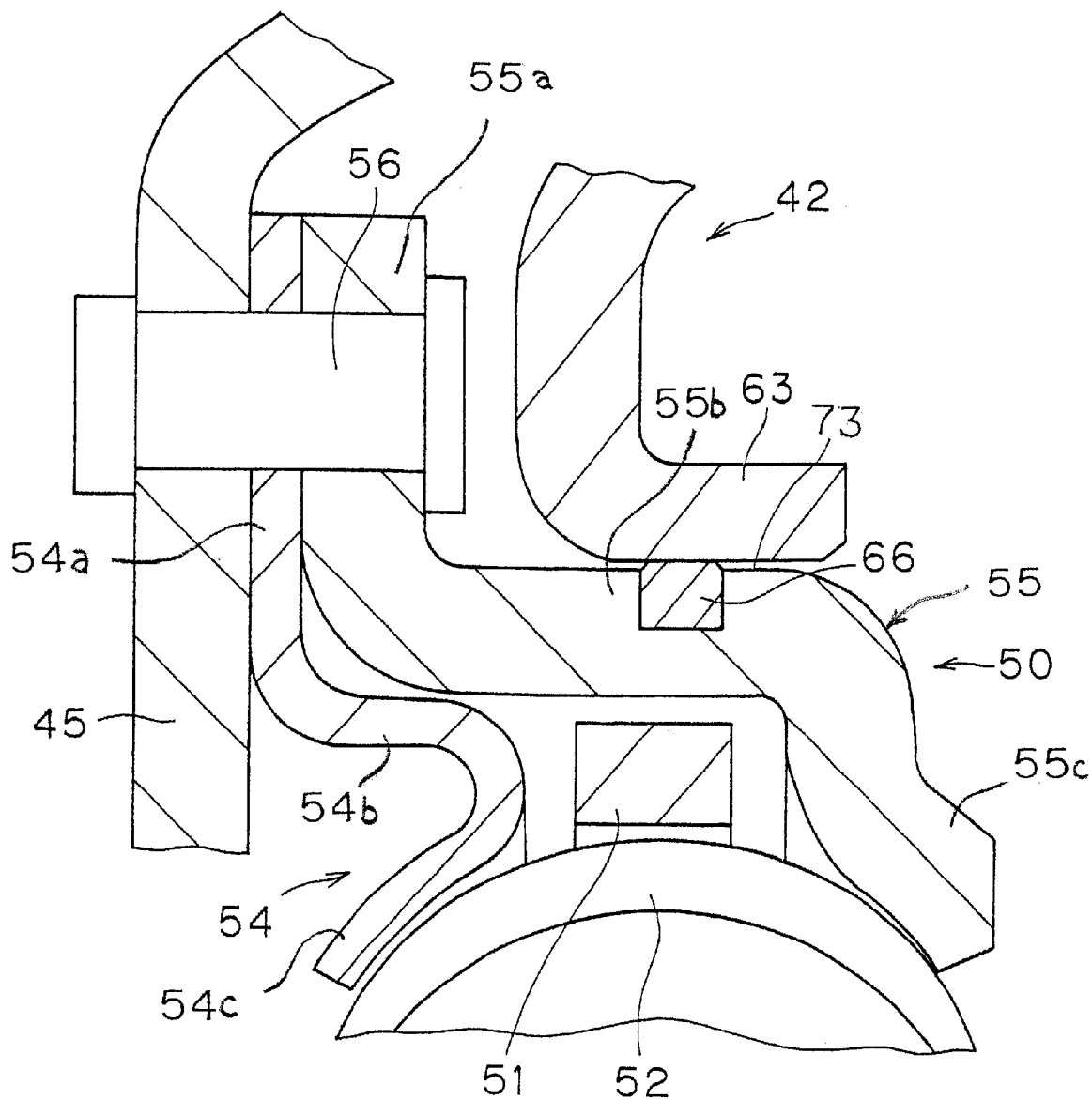
FIG. 3 is an enlarged, partial cross sectional view of a piston supported by the damper mechanism of the lockup device illustrated in FIG. 1 in accordance with the first embodiment of the invention.

Referring initially to FIGS. 1–3, a torque converter 1 is illustrated in accordance with a first embodiment of the present invention. As seen in FIG. 1, the torque converter 1 is primarily formed of a front cover 2, a fluid operating portion 3 and a lockup device 4. The front cover 2 has a radially outer cylindrical portion 8. The fluid operating portion 3 is formed of three kinds of vane wheels (i.e., an impeller 10, a turbine 11 and a stator 12) that are coaxial with the front cover 2. The lockup device 4 is disposed in a space C. The space C is formed axially between the front cover 2 and the turbine 11. The impeller 10 has an impeller shell 15. The front cover 2 and the impeller shell 15 of the impeller 10 are fixedly coupled together at their radially outer portions so that these members form a fluid chamber A. Fluid chamber A is filled with working fluid. The impeller shell 15 has a portion further extending beyond impeller blades 16. The extending portion of the impeller shell 15 is located radially outside the turbine 11, and is integrally formed (i.e., by welding or the like) with the radially outer cylindrical portion 8 of the front cover 2.

The front cover 2 is a member that is supplied with a torque from the crankshaft (not shown) of the engine. The front cover 2 is primarily formed of a disk-like main body 5 and the radially outer cylindrical portion 8. A boss 6 is fixedly coupled to the center of the main body 5 to receive torque from the crankshaft (not shown). Several nuts 7 are fixedly coupled to a surface on the engine side of the outer peripheral portion of the main body 5. The main body 5 is provided at its outer peripheral portion with the outer cylindrical portion 8 that extends toward the transmission.

The outer cylindrical portion 8 is provided along its entire circumference with radial convexities and concavities. The radial convexities and concavities are located in an alternating arrangement to each other. These convexities and concavities provide lugs or splines 9 on the inner radial side of the outer cylindrical portion 8. The front cover 2 is further provided at its outer peripheral portion with an annular and flat friction surface 70 as seen in FIG. 2. The friction surface 70 is located radially inside the outer cylindrical portion 8 of the front cover 2. The friction surface 70 is axially directed to the transmission side of the torque converter 1, and is axially located on the transmission side of the outer peripheral portion of the main body 5.

The fluid operating portion 3 is arranged within the fluid chamber A. The fluid operating portion 3 is located on the transmission side of the fluid chamber A, in the axial direction. Thereby, the fluid chamber A is divided into a fluid operating chamber B and a space C. The fluid operating chamber B is formed of the fluid operating portion 3. The space C is formed between the main body 5 of the front cover 2 and the turbine 11.

The impeller 10 is formed of the impeller shell 15, the impeller blades 16, an impeller core 17 and an impeller hub 18. The impeller blades 16 are fixedly coupled to the inner side of the impeller shell 15. The impeller core 17 is fixedly coupled to the inner sides of the impeller blades 16. The impeller hub 18 is fixedly coupled to the inner periphery of the impeller shell 15.

The turbine 11 is disposed in the fluid chamber A and is axially opposed to the impeller 10. The turbine 11 is formed of a turbine shell 20, a plurality of turbine blades 21, a turbine core 22 and a turbine hub 23. The turbine blades 21 are fixedly coupled to the turbine shell 20. The turbine core 22 is fixedly coupled to the inner sides of the turbine blades 21. The turbine hub 23 is fixedly coupled to the inner periphery of the turbine shell 20. The turbine hub 23 is a cylindrical member and has a radial flange 26. The flange 26 of the turbine hub 23 is fixedly coupled to the inner peripheral portion of the turbine shell 20 by a plurality of rivets 24. The turbine hub 23 is further provided at its inner periphery with a spline 25. The spline 25 is engaged with an output shaft (not shown) extending from the transmission side. Thereby, a torque is transmitted from the turbine hub 23 to the transmission shaft (not shown).

The stator 12 is disposed between the inner peripheral portion of the impeller 10 and the inner peripheral portion of the turbine 11. The stator 12 is a mechanism for regulating a flow of the working fluid returning from the turbine 11 to the impeller 10. The stator 12 is formed of a stator carrier 27, a plurality of stator blades 28 and a stator core 29. The stator blades 28 are fixedly coupled to the outer peripheral surface of the stator carrier 27. The stator core 29 is fixedly coupled to the radially outer sides of the stator blades 28. The stator carrier 27 is carried on a stationary shaft (not shown) via a one-way clutch 30.

A first thrust bearing 32 is disposed axially between an inner peripheral portion of the main body 5 of the front cover 2 and the turbine hub 23. The turbine hub 23 is provided at its end surface with a plurality of radial grooves. The end surface of the turbine hub 23 is located on the engine side of the turbine hub 23, in the axial direction. The radial grooves in the turbine hub 23 allow flow of the working fluid between radially opposite sides of the first thrust bearing 32.

A second thrust bearing 33 is disposed axially between the turbine hub 23 and the one-way clutch 30. A member is provided on the engine side of the one way sub-clutch 30, i.e., the side axially opposed to the engine, and forms a part of the one-way clutch 30. The member is provided with a plurality of radial grooves. These grooves allow flow of the working fluid between the radially opposite sides of the second thrust bearing 33.

A third thrust bearing 34 is disposed axially between the stator carrier 37 and the impeller hub 18. The stator carrier 27 is provided with a plurality of radial grooves on the transmission side of the stator carrier 27, i.e., the side axially opposed to the transmission. These grooves allow flow of the working fluid between the radially opposite sides of the third thrust bearing 34.

In this embodiment, the hydraulic operation mechanism has a first oil passage, a second oil passage and a third oil passage. The first oil passage of the hydraulic operation mechanism is coupled to an axial position between the impeller hub 18 and the stator 12. The second oil passage of the hydraulic operation mechanism is coupled to an axial position between the stator 12 and the turbine hub 23. The third oil passage of the hydraulic operation mechanism is coupled to a position between the turbine hub 23 and the inner peripheral portion of the front cover 2. The first and second oil passages are usually connected to form a common hydraulic circuit for supplying the working fluid to the fluid operating portion 3, and discharging the working fluid from the fluid operating portion 3. The third oil passage is provided for supplying and discharging the working fluid to/from the space C between the front cover 2 and the turbine hub 23 from/to inside the shaft.

The space C will now be described. The space C has an annular form, and is formed axially between the main body 5 of the front cover 2 and the turbine 11. The main body 5 of the front cover 2 defines the engine side of the space C, while the transmission side of the space C is defined by the turbine shell 20 of the turbine 11. The radially outer side of the space C is primarily defined by the inner peripheral surface of the outer cylindrical portion 8, and the radially inner side of the space C is defined by the outer peripheral surface of the turbine hub 23. The radially inner side of the space C, which is located between the inner peripheral portion of the front cover 2 and the turbine hub 23, is communicated with an external hydraulic operation mechanism, as already described. The space C further has a portion, which is communicated with the fluid operating chamber B via a gap formed between the outlet of the impeller 10 and the inlet of the turbine 11.

The lockup device 4 is disposed in the space C for mechanically, rotationally engaging and disengaging the front cover 2 with respect to the turbine 11 in accordance with changes in hydraulic pressure in the space C. The lockup device 4 is primarily formed of a piston mechanism 41 and a piston 42.

The piston mechanism 41 has a piston function, in which the mechanism itself operates in accordance with changes in hydraulic pressure in the space C. The piston mechanism 41 also has a damper function for absorbing and damping torsional vibrations in the rotating direction.

The piston mechanism 41 is formed of a first piston 43 and a damper mechanism 44. The first piston 43 is a disk-like member, which is disposed in an axially adjacent position relative to the main body 5 of the front cover 2. The piston 43 is also located in the space C. The first piston 43 is primarily formed of a disk-like plate 45. The disk-like plate 45 of the piston 43 divides the space C into a first space D adjacent the front cover 2 and a second space E adjacent the turbine 11.

A radially outer portion of the plate 45 forms a first frictional coupling portion 49. The first frictional coupling portion 49 is disposed on the transmission side of the friction surface 70 of the front cover 2. The first frictional coupling portion 49 is an annular, flat plate-like portion, and carries a pair of friction members 46. Friction members 46 are fixedly coupled to axially opposite surfaces of first frictional coupling portion 49. The friction member 46 axially opposed to the friction surface 70 of front cover 2 will be referred to as a first friction member 46a. The other friction member 46 fixedly coupled to the axially opposite surface of first frictional coupling portion 49 will be referred to as a second friction member 46b.

The disk-like plate 45 is provided at its inner periphery with an inner cylindrical portion 71. The inner cylindrical portion 71 extends axially from the inner periphery of the disk-like plate 45 toward the transmission. The inner cylindrical portion 71 has an inner peripheral surface, which is supported on an outer peripheral surface 65 of the turbine hub 23 to allow axial and rotational movement of the inner cylindrical portion 71 relative to turbine hub 23.

The turbine hub 23 is provided at its outer peripheral surface with an annular contact portion 48. Annular contact portion 48 of turbine hub 23 is located on the transmission side of the inner cylindrical portion 71 in an axial direction. This structure restricts the axial movement of the plate 45 toward the transmission when inner cylindrical portion 71 engages annular contact portion 48. The outer peripheral surface 65 is provided with an annular groove. A seal ring 57 is disposed in the annular groove of outer peripheral surface 65. The seal ring 57 contacts the inner peripheral surface of the inner cylindrical portion 71. This seal ring 57 seals the first and second spaces D and E from each other.

As already described, the inner peripheral portion of the first space D is in communication with the third oil passage. The inner peripheral portion of the first space D is also isolated (sealed) from the second space E by the inner periphery of the first piston 43 and the outer peripheral surface 65 of the turbine hub 23. Furthermore, the outer peripheral portion of the first space D is isolated (sealed) from the second space E when the first friction member 46a of first frictional coupling portion 49 is in contact with the friction surface 70 of front cover 2. The outer peripheral portion of the first space D is communicated with the second space E when the first friction member 46a of first frictional coupling portion 49 is spaced from the friction surface 70 of front cover 2.

The damper mechanism 44 is a mechanism for transmitting a torque of the first piston 43 toward the turbine 11 and for absorbing and damping the torsional vibrations. The damper mechanism 44 is located axially between the inner peripheral portion of the first piston 43 and the inner peripheral portion of the turbine shell 20, and is disposed in the second space E. The damper mechanism 44 is primarily formed of a drive member 50, a driven member 51 and a plurality of coil or torsion springs 52. The drive member 50 is firmly fixedly coupled to the first piston 43 so as to prevent relative rotation between the piston 43 and drive member 50. The driven member 51 can transmit the torque to the turbine 11. The torsion springs 52 elastically couple the drive member 50 and driven member 51 together in the rotating direction.

More specifically, the drive member 50 is formed of first and second drive plates 54 and 55. First and second drive plates 54 and 55 are annular plates, and are arranged to be axially opposed to each other. The first drive plate 54 is axially adjacent to the transmission side of the disk-like plate 45 of the first piston 43. The second drive plate 55 is arranged on the transmission side of the first drive plate 54. The outer peripheral portions of the first and second drive plates 54 and 55 are fixedly coupled to the first piston 43 by a plurality of rivets 56. The inner peripheral portions of the first and second drive plates 54 and 55 are axially spaced from each other. These first and second drive plates 54 and 55 are provided with a plurality of square windows 35 and 36, respectively. The torsion springs 52 are engaged with and located within the plurality of square windows 35 and 36.

As shown in FIG. 3, the first drive plate 54 has an outer peripheral portion 54a, a cylindrical portion 54b and an annular portion 54c. Outer peripheral portion 54a is also fixedly coupled to the first piston 43 by rivets 56. Cylindrical portion 54b extends axially toward the transmission from the outer peripheral portion 54a of first drive plate 54. Annular portion 54 extends radially inward from the cylindrical portion 54b of first drive plate 54. The foregoing square windows 35 are formed in the annular portion 54c.

The second drive plate 55 has an outer peripheral portion 55a, a cylindrical portion 55b and an annular portion 55c. Outer peripheral portion 55a is fixedly coupled to the first piston 43 by rivets 56. Cylindrical portion 55b extends axially toward the transmission from the outer peripheral portion 55a of second drive plate 55. Annular portion 55c extends radially inward from the cylindrical portion 55b of second drive plate 55. The foregoing square windows 36 are formed in the annular portion 55c.

The driven member 51 is an annular plate having an outer peripheral portion, which is located axially between the first and second drive plates 54 and 55. The driven member 51 is provided with a plurality of windows 58 in the positions corresponding to the square windows 35 and 36 in the drive plates 54 and 55, respectively. The torsion springs 52 are arranged in the plurality of windows 58, square windows 35 and square windows 36. Each torsion spring 52 is a coil spring extending in the rotating direction. Each torsion spring 52 is carried in the rotating direction within one of the foregoing windows 58, one of the square windows 35 and one of the square windows 36. The square windows 35 and 36 in the first and second drive plates 54 and 55 also restrict the axial movement of the torsion springs 52.

The driven member 51 is provided at its inner peripheral portion with a cylindrical portion 38 extending axially toward the transmission. The cylindrical portion 38 is provided with a plurality of claw portions 59 extending axially from its tip end toward the transmission.

The damper mechanism 44 further includes a claw member 53. The claw member 53 is firmly fixedly coupled to the turbine 11 for rotation together with the turbine 11. The claw member 53 is rotatable and axially movable with respect to the driven member 51. The claw member 53 has an annular portion 60 that is fixedly coupled to the turbine hub 23 together with the turbine shell 20 by the rivets 24. The annular portion 60 is provided with claw portions 61 extending radially inward from the inner periphery of the annular portion 60. Claw portions 61 will be referred to as first claw portions and claw portions 59 will be referred to as second claw portions. The first claw portions 61 are engaged with the second claw portions 59 of the driven member 51. In this engaged state (of the first and second claw portions), the driven member 51 is non-rotatable and axially movable with respect to the turbine 11. A radial space that forms an axial communication space is formed between the first claw portions 61 and the second claw portions 59, which are engaged together.

The outer peripheral surface of the cylindrical portion 38 of the driven member 51 is in contact with the inner peripheral surface of the second drive plate 55, and thus, is radially supported by second drive plate 55. In this manner, the driven member 51 is centered with respect to the turbine hub 23 via the second drive plate 55 and the first piston 43.

Accordingly, in the above arrangement, the driven member 51 is not radially positioned directly on the turbine hub 23. In other words, the driven member 51 is spaced from turbine hub 23 in this embodiment. Therefore, it is not necessary to form the splines on the turbine hub 23 for non-rotational engagement between the piston mechanism 41 and the turbine 11. As a result, the total machining or working costs can be reduced.

The piston 42 is axially disposed on the transmission side of the outer peripheral portion of the first piston 43 and radially outside the damper mechanism 44. Specifically, piston 42 is disposed radially outside cylindrical portion 55*b* of second drive plate 55. Piston 42 is disposed in the second space E, and is an annular plate. The piston 42 has a second frictional coupling portion 68 axially adjacent the first frictional coupling portion 49. The second frictional coupling portion 68 is located on the transmission side of the first frictional coupling portion 49. The second frictional coupling portion 68 has an annular and flat form as shown in FIG. 2, and has a pressure surface 69 on its engine side. The pressure surface 69 is axially opposed to the second friction member 46*b* of the first frictional coupling portion 49.

The piston 42 is provided at its outer periphery with a radially outer cylindrical portion 62. Radially outer cylindrical portion 62 extends axially toward the transmission. The outer cylindrical portion 62 is positioned radially inside the inner peripheral surface of the outer cylindrical portion 8 of the front cover 2 in a radially side by side arrangement. The outer cylindrical portion 62 is provided with teeth 64. The teeth 64 form radially inward and outward projections in an alternating fashion. The teeth 64 are engaged with the lugs or splines 9 formed on the inner peripheral surface of the outer cylindrical portion 8 of the front cover 2.

Owing to this engagement of the piston 42 with the front cover 2, the piston 42 is non-rotatably and axially movable with respect to the front cover 2. An annular groove is provided in the lugs or splines 9. The groove is provided at the transmission side of the lugs or splines 9, and a wire ring 67 is disposed in the groove. The outer cylindrical portion 62 of the piston 42 has an end surface, on the transmission side. The end surface of the outer cylindrical portion 62 of the piston 42 comes into axial contact with the wire ring 67 so that the axial movement of the piston 42 toward the transmission is restricted. Gaps are formed between the teeth 64 and the lugs or splines 9. These gaps allow axial flow of the working fluid.

The piston 42 is provided at its inner periphery with a radially inner cylindrical portion 63. Inner cylindrical portion 63 extends axially toward the transmission. The inner periphery of the inner cylindrical portion 63 is radially supported by an outer peripheral surface 73 of the cylindrical portion 55*b* of the second drive plate 55. Therefore, the inner cylindrical portion 63 is movable in the rotating and axial directions with respect to cylindrical portion 55*b* of the second drive plate 55. The outer peripheral surface 73 is provided with an annular groove. A seal ring 66 is disposed in the annular groove. The seal ring 66 is in contact with the inner peripheral surface of the inner cylindrical portion 63. This seal ring 66 seals the spaces on the axially opposite sides of the inner periphery of the piston 42 with respect to each other.

In this manner, a third space F is primarily formed axially between the outer peripheral portion of the first piston 43 and the piston 42. The third space F is closed (sealed) by the foregoing seal ring 66 with respect to the portion of the second space E between the piston 42 and the turbine shell 20. The radially outer side of the third space F is closed (sealed) when the second friction member 46*b* of first frictional coupling portion 49 contacts second frictional coupling portion 68. The radially outer side of the third space F is opened when the second friction member 46*b* of first frictional coupling portion 49 is spaced from second frictional coupling portion 68. Since the third space F is formed between the piston 42 and the disk-like plate 45, the number of parts can be reduced, and the structure can be simple. The disk-like plate 45 is provided with a plurality of axial through-apertures 47 located radially inside the first frictional coupling portion 49. The first and third spaces D and F are in fluid communication with each other via these apertures 47.

In view of the above, the clutch coupling portion 40 of the lockup device 4 will be described below. As seen in FIG. 2, the clutch coupling portion 40 is formed of a friction surface 70 of the front cover 2, a first frictional coupling portion 49 of the first piston 43 and a pressure surface 69 of the second frictional coupling portion 68 of the piston 42. Thus, the clutch coupling portion 40 has two friction surfaces. The piston member 42 and the second drive plate 55 rotate relatively to each other when the clutch coupling portion 40 is disengaged. When the clutch coupling portion 40 is engaged, the piston member 42 and the second drive plate 55 rotate together, and sliding in the rotating direction does not occur between the inner cylindrical portion 63 and the cylindrical portion 55*b* of the second drive plate 55.

Since the first and second frictional coupling portions 49 and 68 themselves form the pistons which move in the axial direction, the pressing force by the first piston 43 acts between the friction surface 70 and the first friction member 46*a*. The pressing force by the piston 42 acts between the second friction member 46*b* and the pressure surface 69.

In this clutch coupling portion 40, the inner diameter (ID2) of the piston 42 is larger than the inner diameter (ID1) of the first piston 43. The different diameters of piston 42 (ID1) and first piston 43 (ID2) are provided so that the pressing force applied from the piston 42 to the first frictional coupling portion 49 is smaller than that in the case where the piston 42 and the first piston 43 have equal inner diameters. Accordingly, the produced pressing force can be smaller than that in the case where the friction surface is merely doubled, and thereby wearing and breakage of the friction members 46 and other members can be prevented. By changing the size of the piston 42, the pressing force acting on the clutch coupling portion 40 can be easily changed. From the above, it can be deemed that the piston 42 has the inner diameter larger than the inner diameter of the piston mechanism 41. The above structure provides the foregoing effects when the piston mechanism 41 is not provided with the damper mechanism 44.

The piston 42, which is the input member rotating together with the front cover 2, is arranged radially outside the damper mechanism 44. More specifically, the piston 42 has an inner diameter larger than the outer diameter of the cylindrical portion 55*b* of drive plate 55 of the damper mechanism 44, and is located radially outside the damper mechanism 44. Therefore, axial space on one side of the damper mechanism 44 is not restricted. Accordingly, the axial size of the torsion springs 52 (i.e., diameter of each torsion spring) in the damper mechanism 44 can be increased. Such an increase in spring diameter can lower the rigidity or spring constant of torsion springs 52. Therefore, the axial space allows a choice in spring diameters. This facilitates the design and a high performance of torsion springs 52 without the need to change other characteristics of the torsion springs 52. Consequently, the lockup device has a simplified design and it is easy to vary the torsional characteristics of the damper mechanism 44.

The piston 42, which is an axially movable piston member, is radially supported by a portion of the damper mechanism 44, and particularly, by the second drive plate 55 forming a part of the drive member 50. Thereby, it is not necessary to provide an additional member dedicated to the support of the piston 42, and the whole structure of the lockup device 4 can be simple.

The operation of the lockup device 4 of the torque converter 1 will now be described below. In the disengaged state of the lockup device 4, the first space D is pressurized with the working fluid to separate pistons 42 and 43 from the front cover 2. In other words, the working fluid is supplied from the third oil passage to the radially inner side of the first space D. The working fluid in the first space D flows radially outward to the radially outer portion of the second space E through the gap between the friction surface 70 and the first friction member 46a and through the gap between the lugs or splines 9 and the teeth 64. The working fluid in the second space E flows into the fluid operating chamber B through the gap between the impeller shell 15 and the turbine shell 20 and through the gap between the outlet of the impeller 10 and the inlet of the turbine 11.

The working fluid moving into the first space D also flows through the apertures 47 formed in the first piston 43 into the third space F. The working fluid in the third space F flows radially outward through a gap between the pressure surface 69 and the second friction member 46b. This working fluid likewise flows through the gap between the lugs or splines 9 and the teeth 64 into the radially outer portion of the second space E.

In this embodiment, since the first piston 43 and the piston 42 function as a pair of pistons that move axially in accordance with changes in hydraulic pressure, the axial movements of these members are very stable. Accordingly, contact between the members in the clutch coupling portion 40 is suppressed. More specifically, the wire ring 67 restricts the axial movement of the piston 42 toward the transmission, while the annular contact portion 48 of the turbine hub 23 restricts the axial movement of the first piston 43. Consequently, as shown in FIG. 2, predetermined clearances are kept between the friction surface 70 and the first friction member 46a, and between the second friction member 46b and the pressure surface 69, respectively, when the first space D is filled with the working fluid moving.

The coupling operation of the lockup device 4 will now be described. The working fluid is drained from the first space D through the third oil passage. Thereby, the working fluid in the first space D flows radially inward, and the working fluid in the third space F flows into the first space D through the apertures 47. Thereby, the first piston 43 moves axially toward the engine, and the first friction member 46a of first frictional coupling portion 49 comes into contact with the friction surface 70 of the front cover 2. The piston 42 likewise moves axially toward the engine so that the pressure surface 69 comes into contact with the second friction member 46b of the first frictional coupling portion 49. Since the first and third spaces D and F are in communication with each other via the apertures 47, the piston 42 can perform and operate smoothly. In other words, the pressure difference acts on both pistons to move both pistons smoothly.

The lockup device 4 is disengaged by supplying the working fluid into the first space D. The working fluid separates the pistons 42 and 43 from each other and separates piston 43 from the front cover 2. Specifically, when the working fluid is supplied through the third oil passage into the first space D, the working fluid moves radially outward, and flows through the apertures 47 into the third space F. As a result, the first piston 43 and the piston 42 axially move toward the transmission. The first piston 43 moves until inner cylindrical portion 71 contacts annular contact portion 48. Piston 42 moves until outer cylindrical portion 62 contacts wire ring 67. Preferably wire ring 67 and annular contact portion 48 are arranged so piston 42 can axially move more than first piston 43. As described above, the apertures 47 enable the smooth operation of the piston 42. In other words, the pressure difference acts on both pistons to move both pistons smoothly.

Second Embodiment

Figure 4:
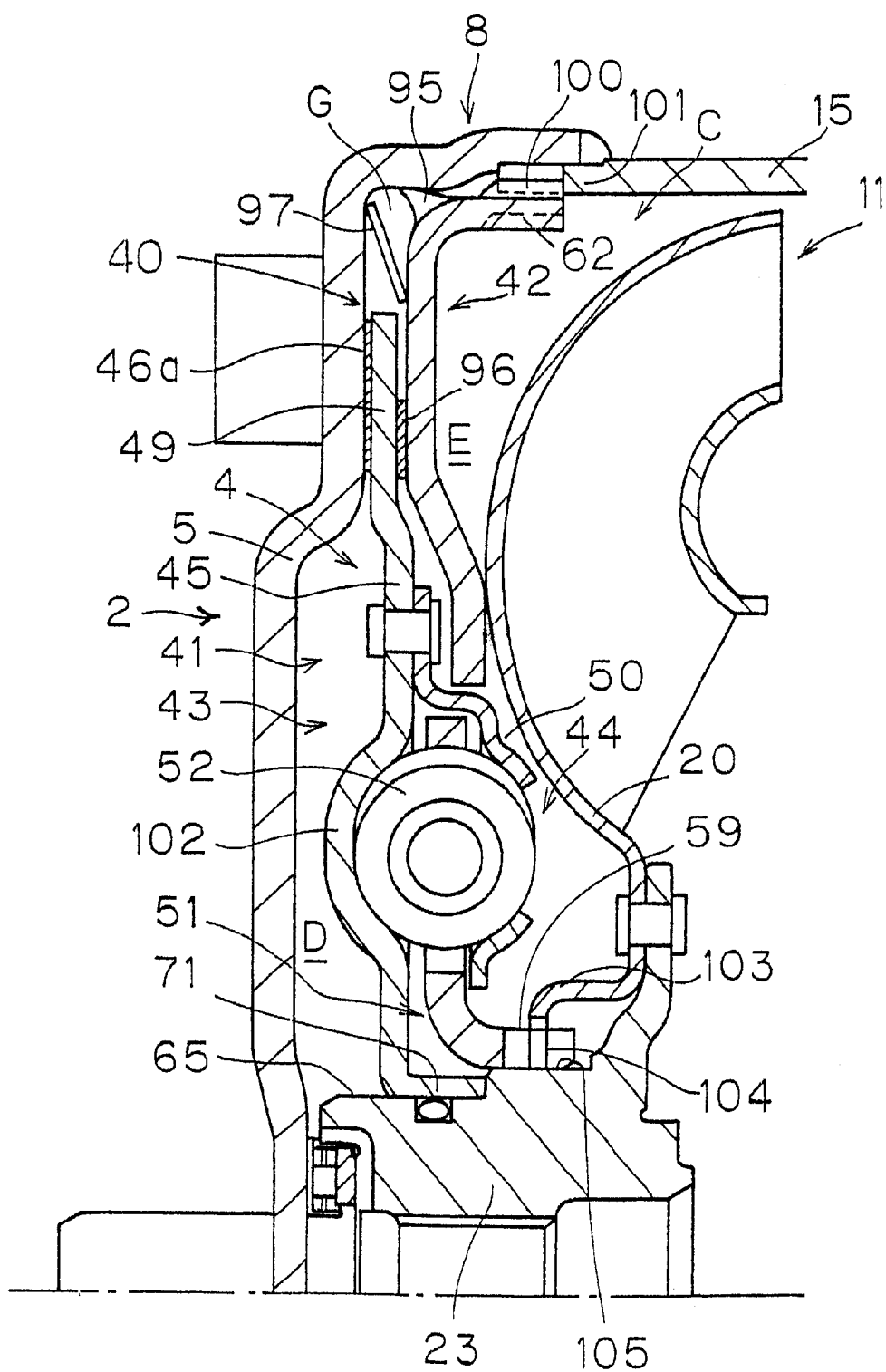
FIG. 4 is a schematic, partial cross sectional view of an upper half of a torque converter in accordance with another embodiment of the present invention.

Referring now to FIG. 4, the lockup device 4 has been modified in accordance with a second embodiment of the present invention. The second embodiment is substantially the same as the first embodiment, except for portions that have been modified as explained below. Since this embodiment is substantially the same as the first embodiment, this embodiment will not be discussed or illustrated in detail herein. Moreover, since this embodiment is substantially the same as the first embodiment, identical or substantially identical parts will be identified with the same reference numerals as the first embodiment.

Specifically, the second embodiment has been modified such that the inner peripheral surface of the piston 42 is not in contact with the piston mechanism 41 in this embodiment. Therefore, the inner peripheral surface of the piston 42 is not supported by the piston mechanism 41 in this embodiment. This structure creates an arrangement where the spaces on the axially opposite sides of the piston 42 are in fluid communication with each other via a space radially inside the piston 42.

The radially outer portion of the piston 42 extends radially outward beyond the radially outer peripheral portion of first frictional coupling portion 49 of the first piston 43. The radially outer portion of the piston 42 is located substantially close to the outer cylindrical portion 8 of the front cover 2. An annular fourth space G is kept radially outside the first piston 43. The fourth space G is axially located between the main body 5 of the front cover 2 and the outer peripheral portion of the piston 42.

An annular seal member 95 contacts the inner peripheral surface of the outer cylindrical portion 8 of the front cover 2 and is fixedly coupled to the outer peripheral surface of the piston 42. A space is formed between the outer cylindrical portion 8, the outer peripheral portion of the piston 42 and the seal member 95. The seal member 95 connected to the piston 42 also form part of the periphery of the fourth space G such that the seal member 95 and the piston 42 act as a divider to seal the spaces.

As described above, the fourth space G has a radially outer portion sealed by the seal member 95. The fourth space G also has a radially inner portion that is closed by the clutch coupling portion 40 in the engaged position. A conical spring 97 is located in the fourth space G. The conical spring 97 is axially and elastically deformed at least when the piston 42 moves axially to an end position on the engine side (i.e., the position achieving the lockup device engaged state). Therefore, the conical spring 97 biases the piston 42 to move away from the front cover 2 at least in the lockup device engaged state.

The first and second friction members 46a and 96, which are fixedly coupled to the first frictional coupling portion 49 of the first piston 43, will now be described in more detail. The first friction member 46a is the same as that in the first embodiment. The second friction member 96 replaces the second friction member 46b of the first embodiment. The second friction member 96 has an inner diameter equal to the inner diameter of the first friction member 46a, but has an outer diameter smaller than the outer diameter of the first friction member 46a. As a result, the radial width of the second friction member 96 is preferably about half the radial width of the first friction member 46a. In the lockup device engaged state, only the radially inner portion of the pressure surface 69 of the piston 42 is in contact with the second friction member 96. The radially outer portion of the pressure surface 69 is spaced from the corresponding radial portion of the first frictional coupling portion 49 not carrying the second friction member 96, in the lockup device engaged state. The space between the radially outer portion of the pressure surface 69 and the corresponding radial portion of the first frictional coupling portion 49 forms a portion of the foregoing fourth space G.

In this embodiment, the impeller shell 15 is provided with lugs or splines 100 in contrast to the first embodiment, which utilizes lugs or splines formed on the outer cylindrical portion 8 of front cover 2. Further, the impeller shell 15 is provided with a socket portion 101 that is axially opposed to the outer cylindrical portion 62 of the piston 42.

Additionally, the inner peripheral surfaces of the axially extending second claw portions 59 of the driven member 51 are radially supported by a second outer peripheral surface 105 of the turbine hub 23 in this embodiment. Also, a first engagement portion 103 replaces the first engagement portion 53 of the first embodiment. First engagement portion 103 has a plurality of first claw portions 104 and is integrally formed with the turbine shell in this embodiment. Preferably, first engagement portion 103 is formed as a one-piece unitary member with the turbine shell. First claw portions 104 of the first engagement portion 103 are non-rotatably coupled to the second claw portions 59 of the driven member 51 so the driven member and turbine rotate together. Second claw portions 59 are axially movable with respect to first claw portions 104.

The first drive plate 54 of the first embodiment has been eliminated in this embodiment. Alternatively, the first piston 43 has been modified to support the torsion springs 52 and functions as a damper casing. More specifically, the first piston 43 is provided with a spring support portion 102. The spring support portion 102 supports the radially opposite sides of the torsion springs 52. The spring support portion 102 is an axially projected portion formed by drawing or the like. The spring support portion 102 is not provided with an axial aperture or recess. In the spring support portion 102, the portions in contact with the torsion springs 52 are subjected to a predetermined thermal treatment or the like during the manufacturing process. As described above, the first piston 43 functions as a damper casing of the damper mechanism 44. Therefore, one of the drive plates (i.e., drive plate 54 in this case) can be eliminated. As a result, the required parts can be reduced in number, and the whole structure can be simple.

During the disengagement of the lockup device 4, the working fluid is supplied from the third oil passage into the first space D. The working fluid in the first space D moves radially outward, and flows into the fourth space G through a gap between the friction surface 70 of the front cover 2 and the first friction member 46a. The working fluid in the fourth space G then flows radially inward through a gap between the second friction member 96 and the pressure surface 69. The working fluid further flows into the second space E through the gap between the inner peripheral portion of the piston 42 and the damper mechanism 44.

In this state, the conical spring 97 restricts the axial movement of the piston 42 toward the engine. Therefore, a drag torque can be suppressed when the lockup device 4 is in the disengaged state.

When the working fluid is drained from the first space D through the third oil passage, the first piston 43 and the piston 42 move axially toward the engine. Thereby, the first friction member 46a is pressed against the friction surface 70, and the pressure surface 69 is pressed against the second friction member 96. In this embodiment, since the second friction member 96 has a smaller effective radius than the second friction member 46b of the first embodiment, the torque that can be transmitted by the second friction member 96 can be smaller than that in the first embodiment. In this embodiment, however, the second friction member 96 has a smaller surface area due to the smaller outer diameter, and thereby has a receiving area to receive an increased pressure. By appropriately determining the pressure on the piston 42, therefore, the second friction member 96 can be configured to transmit a torque equal to or larger than that in the prior art.

When the working fluid is supplied from the third oil passage into the first space D, the first piston 43 and the piston 42 move axially toward the transmission to disengage the lockup device. At the same time, the conical spring 97 reliably and smoothly moves the piston 42 toward the transmission.

Third Embodiment

Figure 5:
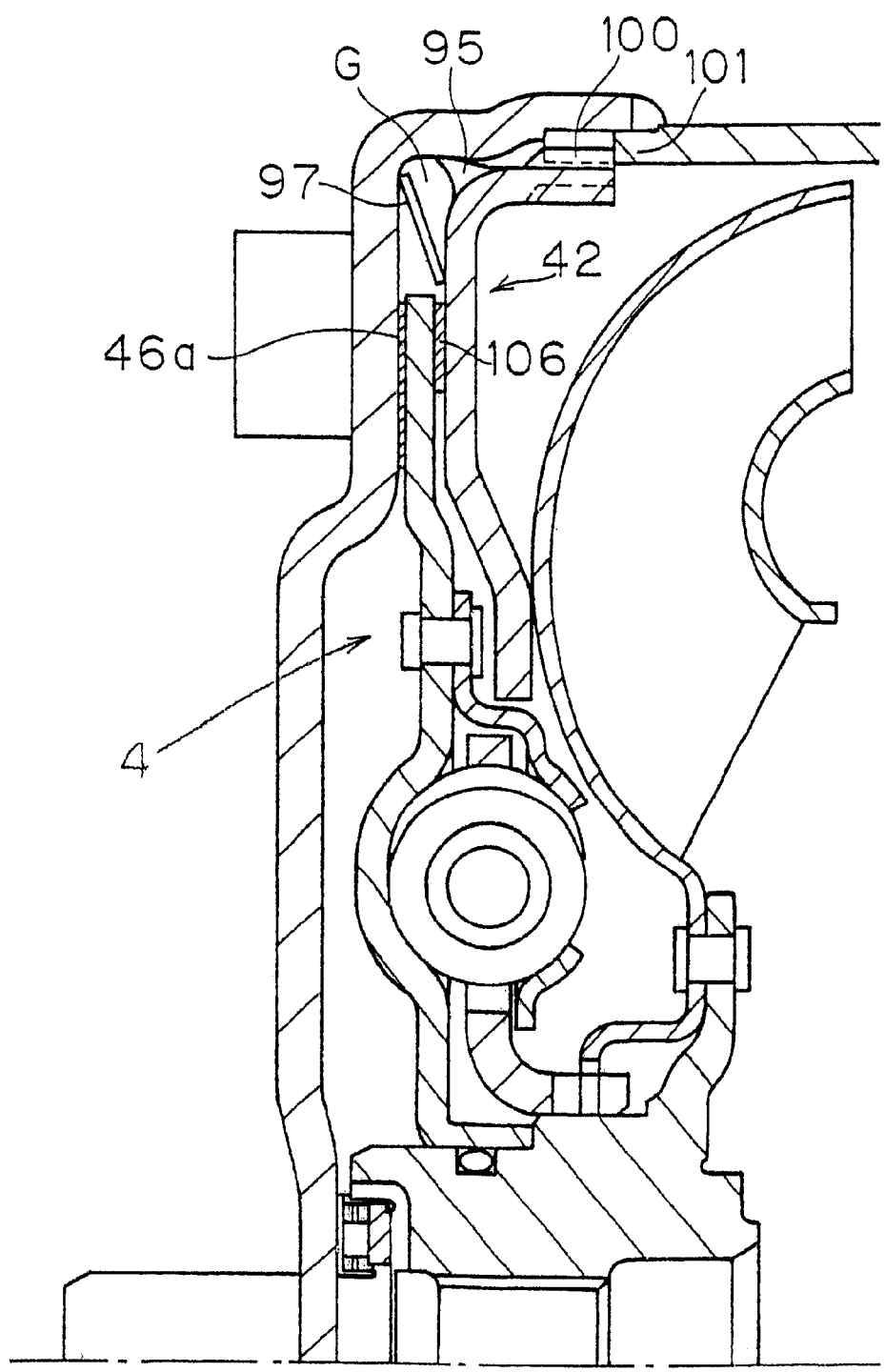
FIG. 5 is a schematic cross sectional view of an upper half of a torque converter in accordance with another embodiment of the present invention.

Referring now to FIG. 5, the lockup device 4 has been modified in accordance with a third embodiment of the present invention. The third embodiment is substantially the same as the second embodiment, except for portions that have been modified as explained below. Since this embodiment is substantially the same as the second embodiment, this embodiment will not be discussed or illustrated in detail herein. Moreover, since this embodiment is substantially the same as the second embodiment, identical or substantially identical parts will be identified with the same reference numerals as the second embodiment.

Specifically, the third embodiment has been modified such that a second friction member 106 is provided in this embodiment that replaces the second friction member 96 of the second embodiment. The second friction member 106 has the substantially same outer diameter as the first friction member 46a, but has a larger inner diameter. Therefore, the radial width of the second friction member 106 is preferably about half the radial width of the first friction member 46a. The friction surface defined between the second friction member 106 and the pressure surface 69 has a larger effective radius than that defined by the first friction member 46a. Therefore, the torque being transmitted through the second friction member 106 can be increased. Thereby, the torque being transmitted through the second friction member 106 can be equal to or larger than the torque being transmitted through the first friction member 46a, even if the pressing force applied by the piston 42 is smaller than that applied by the first piston 43.

Fourth Embodiment

Figure 6:
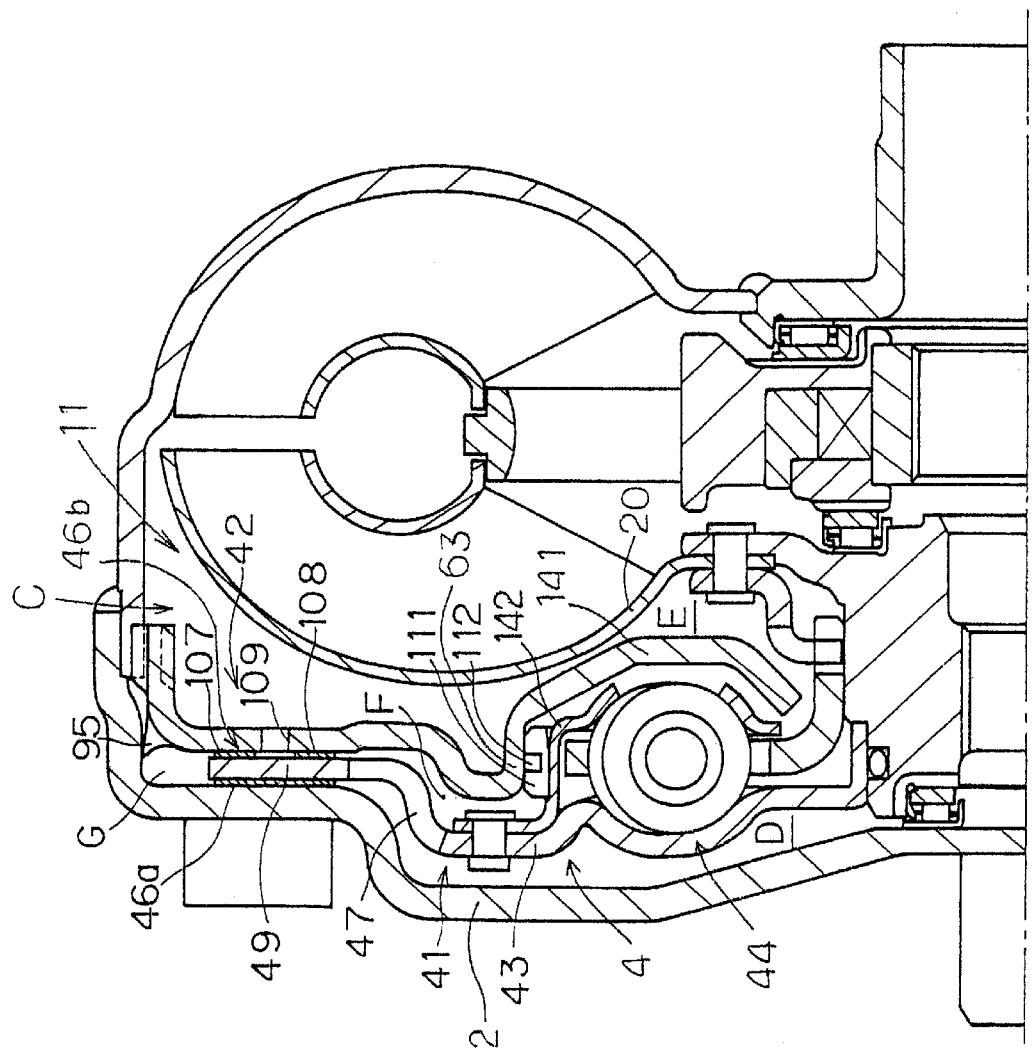
FIG. 6 is a schematic cross sectional view of an upper half of a torque converter in accordance with another embodiment of the present invention.

Referring now to FIG. 6, the lockup device 4 has been modified in accordance with a fourth embodiment of the present invention. The fourth embodiment is substantially the same as the first embodiment, except for portions that have been modified as explained below. Since this embodiment is substantially the same as the first embodiment, this embodiment will not be discussed or illustrated in detail herein. Moreover, since this embodiment is substantially the same as the first embodiment, identical or substantially identical parts will be identified with the same reference numerals as the first embodiment.

Specifically, the fourth embodiment has been modified such that a fourth space G is formed axially between the piston 42 and the front cover 2. The fourth space G is formed axially between the piston 42 and the front cover 2. The fourth space G is located radially outside the first frictional coupling portion 49 of the first piston 43, and is the same as the fourth space G in the second and third embodiments. In this embodiment, third space F is formed axially between the piston 42 and the outer peripheral portion of the first piston 43, and is similar to the space F in the first embodiment.

The third space F is in communication with the first space D through the apertures 47 formed in the first piston 43. The inner peripheral portion of the third space F is sealed with respect to the second space E by a seal mechanism. The seal mechanism is formed of a collar 111 and a seal ring 112. More specifically, the collar 111 is welded to the outer periphery of a drive plate 142. The drive plate 142 replaces the first and second drive plates 54 and 55 of the first embodiment.

The collar 111 is a cylindrical member and forms the outer peripheral surface of the drive plate 142. The collar 111 is provided at its outer peripheral surface with an annular groove. A seal ring 112 is disposed in the annular groove of the collar 111. The seal ring 112 contacts an inner peripheral surface of the piston 42. In this manner, the inner peripheral surface of the inner cylindrical portion 63 of the piston 42 is radially supported on the outer peripheral surface of the collar 111.

The second friction coupling portion 68 of the piston 42 is provided with a plurality of axial through-apertures 109. The apertures 109 are arranged circumferentially on the same circle. The apertures 109 are configured such that the fluid communication of the third and fourth spaces F and G to the second space E is prevented when the piston 42 is in contact with the second friction member 46b. The above communication arrangement is established when the piston 42 is axially spaced from the second friction member 46b. In this embodiment, the second friction member 46b is provided with an annular groove located in the radial position corresponding to the radial positions of apertures 109. This annular groove has a larger radial length than the apertures 109 so that the apertures 109 are located within the annular groove. In other words, the second friction member 46b is formed of a radially outer friction member 107 and a radially inner friction member 108, and the annular groove between the members 107 and 108 corresponds to the radial locations of the apertures 109.

When the clutch coupling portion 40 is in the disengaged state, the working fluid is supplied from the third oil passage into the first space D. The working fluid then moves radially outward in the first space D, and flows through the apertures 47 into the third space F. The working fluid flows through the gap between the friction surface 70 and the first friction member 46a into the fourth space G. The working fluid in the third space F flows radially outward through a gap between the radially inner friction member 108 and the pressure surface 69, and flows through the apertures 109 into the second space E. The working fluid in the fourth space G flows into the second space E through the gap between the radially outer friction member 107 and the pressure surface 69, and flows through the apertures 109.

When the oil is drained from the first space D through the third oil passage, the working fluid in the third space F flows through the apertures 47 into the first space D. The working fluid in the fourth space G flows radially inward along the sides of the first and second friction members 46a and 46b. As a result, the first piston 43 and the piston 42 axially move toward the engine so that the first friction member 46a is pressed against the friction surface 70, and the pressure surface 69 is pressed against the second friction member 46b. In this manner, the lockup device 4 is engaged. In this embodiment, a pressure receiving portion of the piston 42 is enlarged radially inwardly and outwardly beyond the second friction member 46b. Since the pressure receiving portion of the piston 42 is enlarged, the pressing force acting from the piston 42 to the second friction member 46b can be large. As a result, the transmission torque of the lockup device 4 is increased.

The piston 42 has a stirring portion 141, which extends radially inward from the radially inner portion of the third space F. The stirring portion 141 is an annular portion extending radially inward from the inner cylindrical portion 63 of the piston 42. The stirring portion 141 extends between the damper mechanism 44 and the turbine shell 20. The stirring portion 141 has an inner periphery extended to the vicinity of the second claw portions 59 of the driven member 51.

The function of the stirring portion 141 will now be described in more detail. In the lockup device 4 of this embodiment, the first piston 43 divides the space C into the first and second spaces D and E. The first space D is a space through which the working fluid can be supplied and drained from the third oil passage. In contrast to this, the second space E is a space that is primarily located between the piston mechanism 41 and the turbine 11. The piston mechanism 41 and the turbine 11 are non-rotatably coupled together. The working fluid does not usually flow in the second space E. In this case, even in the disengaged state of the lockup device 4, the working fluid flows in the first space D, and the working fluid does not flow through a major portion of the second space E. Therefore, the hydraulic pressure in the first space D may become lower than that in the second space E due to the flow of the working fluid. If such a pressure difference arises, the first piston 43 and the piston 42 may axially move toward the engine. This axial movement would cause contact between the members in the clutch coupling portion 40. Such contact would cause a drag torque.

In this embodiment, the piston 42 is arranged in the second space E as an input member rotating together with the front cover 2. Additionally, piston 42 has a portion located in the radially inner portion of the second space E. Therefore, the working fluid can be stirred and flowed in the second space E by stirring portion 141. Thereby, a balance in pressure is kept between the first and second spaces D and E. This balance in pressure between the first and second spaces D and E helps prevent the axial movement of the first piston 43 or piston 42 toward the engine. Consequently, the drag torque can be smaller than that in the structure without the stirring portion 141.

Fifth Embodiment

Figure 7:
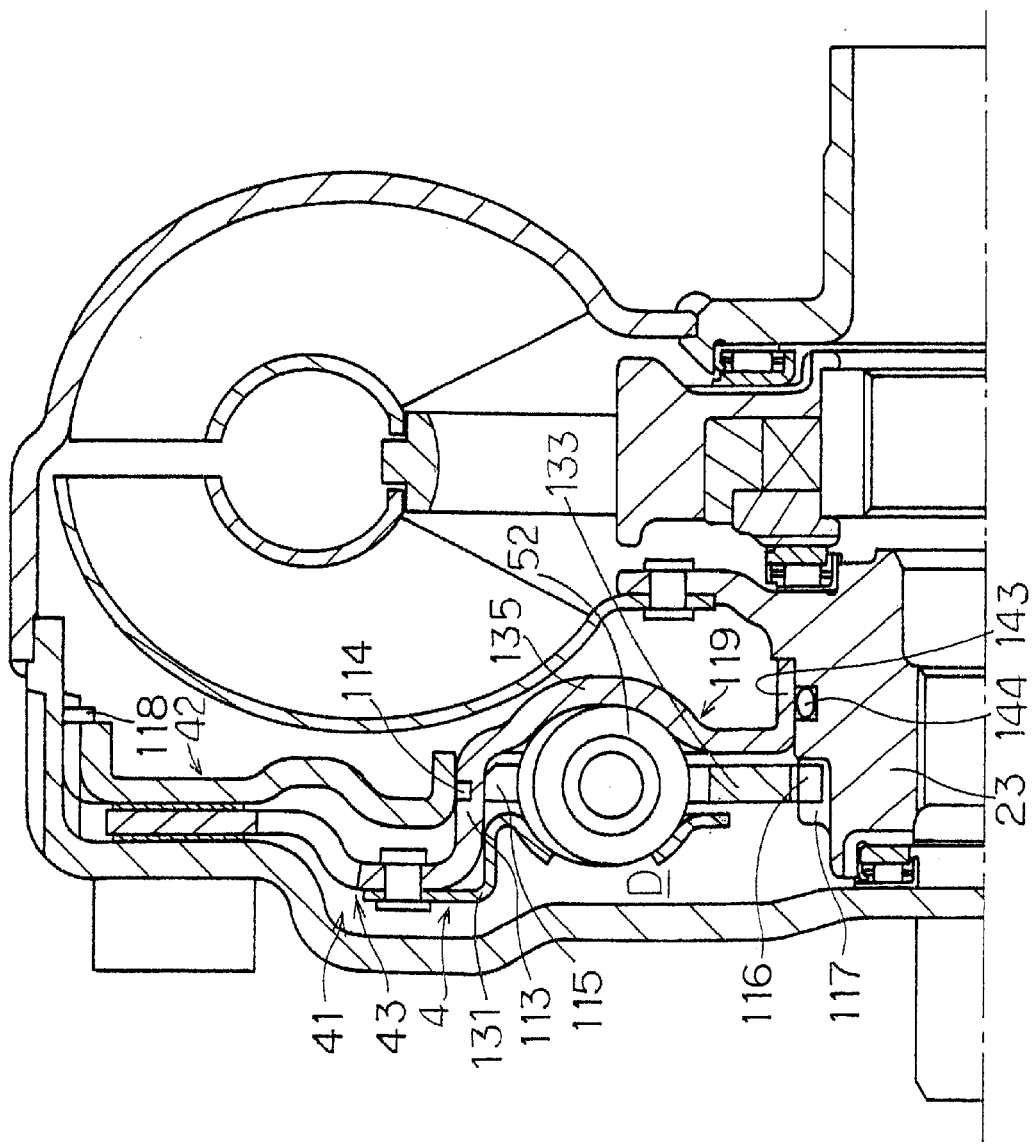
FIG. 7 is a schematic cross sectional view of an upper half of a torque converter in accordance with another embodiment of the present invention.

Referring now to FIG. 7, the lockup device 4 has been modified in accordance with a fifth embodiment of the present invention. The fifth embodiment is substantially the same as the first embodiment, except for portions that have been modified as explained below. Since this embodiment is substantially the same as the first embodiment, this embodiment will not be discussed or illustrated in detail herein. Moreover, since this embodiment is substantially the same as the first embodiment, identical or substantially identical parts will be identified with the same reference numerals as the first embodiment.

Specifically, this fifth embodiment has been modified such that a snap ring 118 is fixedly coupled to the lugs or splines 9 of the front cover 2. The snap ring 118 is axially opposed to the outer cylindrical portion 62 of the piston 42, and is provided for the purpose of restricting the axial movement of the piston 42 toward the engine.

The first piston 43 has been modified to have a radially inner portion that is axially shifted toward the transmission with respect to its radially outer portion. The piston 42 has the inner peripheral surface which is rotatably and axially movably supported by a cylindrical portion 113 formed on the radially middle portion of the first piston 43. The cylindrical portion 113 of the first piston 43 is provided at its outer peripheral surface with an annular groove. A seal ring 114 is arranged in the annular groove. The seal ring 114 is in contact with the inner peripheral surface of the piston 42 for sealing the spaces on the axially opposite sides of the piston 42 from each other. The first piston 43 is provided at its inner periphery with an inner cylindrical portion 143 extending axially toward the transmission. The inner cylindrical portion 143 is radially supported by the outer peripheral surface of the turbine hub 23. The turbine hub 23 is provided at its outer peripheral surface with an annular groove. A seal ring 144 is arranged in the annular groove of the turbine hub 23. The seal ring 144 is in contact with the inner peripheral surface of the inner cylindrical portion 143 of the first piston 43.

A damper mechanism 119 is axially located on the engine side of the inner peripheral portion of the first piston 43. Therefore, damper mechanism 119 is located in the first space D. The damper mechanism 119 is formed of a drive plate 131, the torsion springs 52 and a driven member 133. The drive plate 131 replaces the first and second drive plates 54 and 55 of the first embodiment. The drive plate 131 has a radially outer portion fixedly coupled to the first piston 43. The drive plate 131 axially supports the engine side of the torsion springs 52. The first piston 43 has a spring support 135 that axially supports the transmission side of the torsion springs 52. The spring support portion 135 also circumferentially supports the opposite radial ends of the torsion springs 52. The driven member 133 is a disklike member provided at its inner periphery with teeth 116. The teeth 116 are nonrotatably and axially movably engaged with teeth 117. Teeth 117 are formed on the outer periphery of the turbine hub 23. Spaces extending over the entire axial lengths of the teeth 116 and 117 are formed between these teeth 116 and 117.

The driven member 133 has an outer peripheral portion 115. The outer peripheral surface of the outer peripheral portion 115 is radially supported by the inner peripheral surface of the cylindrical portion 113 of the first piston 43.

Sixth Embodiment

Figure 8:
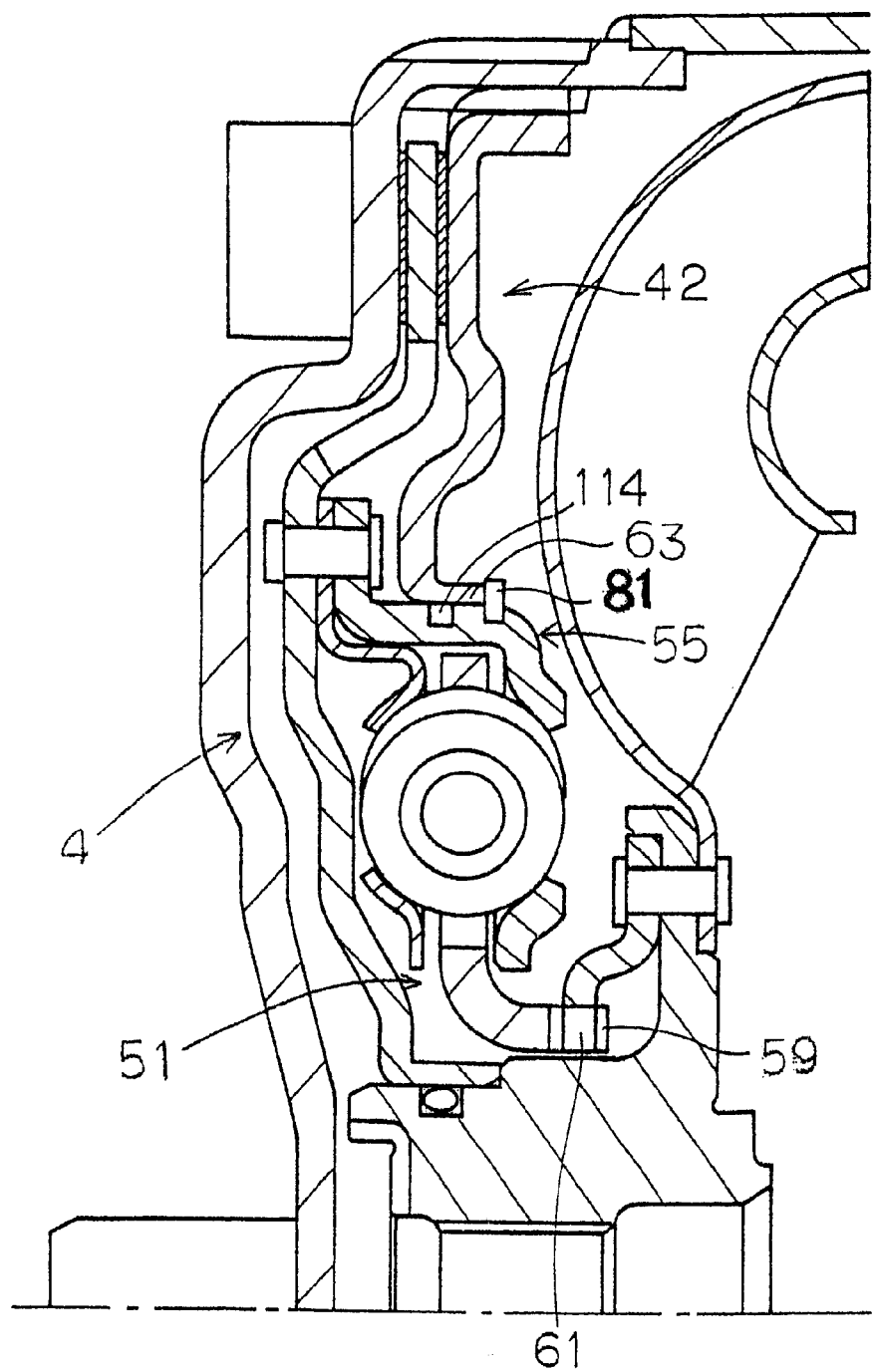
FIG. 8 is a schematic, partial cross sectional view of an upper half of a torque converter in accordance with yet another embodiment of the present invention.

Referring now to FIG. 8, the lockup device 4 has been modified in accordance with a sixth embodiment of the present invention. The sixth embodiment is substantially the same as the first embodiment, except for portions that have been modified as explained below. Since this embodiment is substantially the same as the first embodiment, this embodiment will not be discussed or illustrated in detail herein. Moreover, since this embodiment is substantially the same as the first embodiment, identical or substantially identical parts will be identified with the same reference numerals as the first embodiment.

Specifically, this sixth embodiment has been modified such that a snap ring 81 is arranged on the outer peripheral surface of the second drive plate 55. The wire ring 67 of the first embodiment has been removed. The snap ring 81 is axially opposed to the inner cylindrical portion 63 of the piston 42. In the first embodiment, axial movement of the piston 42 is restricted at the radially outer portion of the piston 42 by the wire ring 67. In this sixth embodiment, axial movement of the piston 42 is restricted at the radially inner portion of the piston 42 by the snap ring 81.

Additionally, the first claw portions 61 radially position the driven member 51 in this embodiment. The drive plate 55 in the first embodiment radially positions the driven member 51. The inner peripheral surfaces of first claw portions 61 are in contact with the outer peripheral surfaces of the second claw portions 59 to radially position the driven member 51.

Seventh Embodiment

Figure 9:
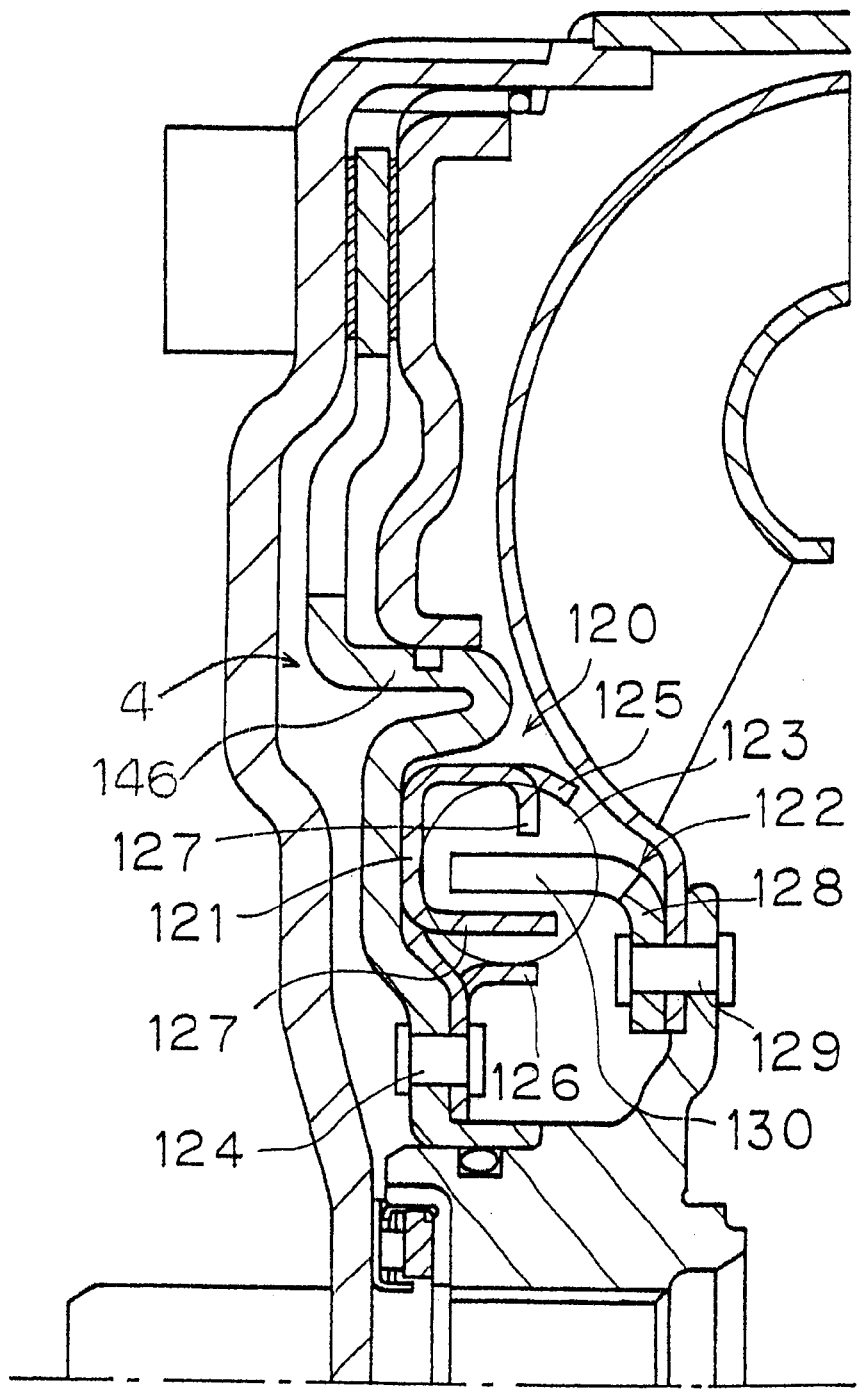
FIG. 9 is a schematic, partial cross sectional view of an upper half of a torque converter in accordance with still another embodiment of the present invention.

Referring now to FIG. 9, the lockup device 4 has been modified in accordance with a seventh embodiment of the present invention. The seventh embodiment is substantially the same as the first embodiment, except for portions that have been modified as explained below. Since this embodiment is substantially the same as the first embodiment, this embodiment will not be discussed or illustrated in detail herein. Moreover, since this embodiment is substantially the same as the first embodiment, identical or substantially identical parts will be identified with the same reference numerals as the first embodiment.

In the lockup device 4 shown in FIG. 9, the first piston 43 has been modified such that it is provided at its radially middle portion with a cylindrical portion 146. The cylindrical portion 146 supports the inner peripheral portion of the piston 42.

Additionally, a damper mechanism 120 in this embodiment replaces the damper mechanism 44 of the first embodiment. The damper mechanism 120 is located on the transmission side of the inner peripheral portion of the first piston 43. The damper mechanism 120 is primarily formed of a drive plate 121, a driven plate 122 and a plurality of torsion springs 123. The drive plate 121 is an annular plate, and is located on the transmission side of the first piston 43. The drive plate 121 is firmly fixedly coupled to the inner peripheral portion of the first piston 43. More specifically, the drive plate 121 is in contact with the first piston 43, and the inner peripheral portion of the drive plate 121 is fixedly coupled to the first piston 43 by a plurality of rivets 124. The drive plate 121 is provided with supports 125 and 126 for supporting the radially opposite sides of each torsion spring 123. The drive plate 121 is also provided supports 127 for supporting the circumferentially opposite ends of the torsion springs 123. The driven plate 122 has an annular portion 128 fixedly coupled to the turbine hub 23 by a plurality of rivets 129. The driven plate 122 also has claws 130 which extend axially toward the engine, and are engaged with the circumferentially opposite ends of each torsion spring 123.

Eighth Embodiment

Figure 10:
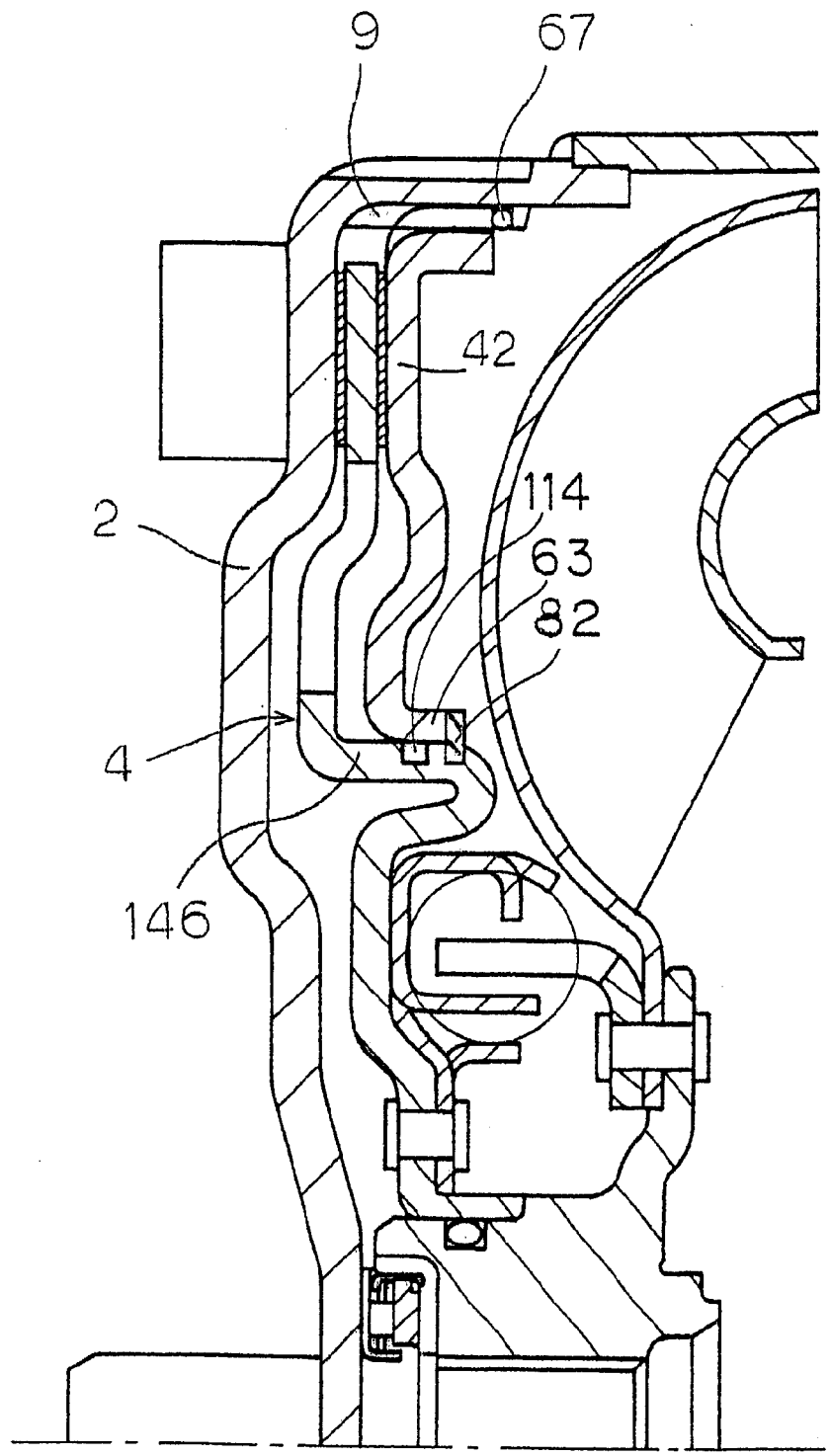
FIG. 10 is a schematic, partial cross sectional view of an upper half of a torque converter in accordance with yet still another embodiment of the present invention.

Referring now to FIG. 10, the lockup device 4 has been modified in accordance with an eighth embodiment of the present invention. The eighth embodiment is substantially the same as the seventh embodiment, except for portions that have been modified as explained below. Since this embodiment is substantially the same as the seventh embodiment, this embodiment will not be discussed or illustrated in detail herein. Moreover, since this embodiment is substantially the same as the seventh embodiment, identical or substantially identical parts will be identified with the same reference numerals as the seventh embodiment.

In this embodiment, a snap ring 82 is arranged on a cylindrical portion 146 of the first piston 43. The snap ring 82 is opposed to the inner cylindrical portion 63 of the piston 42. In this embodiment, the axial movement of the radially outer portion of the piston 42 is also restricted. More specifically, a wire ring 67 is arranged on the lugs or splines 9 of the front cover 2, similarly to the first and seventh embodiments. However, in the eighth embodiment, since the radially inner and outer portions of the piston 42 are restricted against axial movement, the position and attitude of the piston 42 in the lockup device disengaged state can be stable.

In the lockup device of the torque converter according to the present invention, the driven member is divided into the portion for performing the torque transmission and the portion that is radially supported. Therefore, it is not necessary to machine or work the turbine hub for forming a spline or splines. Consequently, the structure can be simple and the working cost can be low, compared with the prior art.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:
   a plate disposed near the friction surface of the front cover;
   a piston disposed on a side of said plate that faces away from the friction surface of the front cover, said piston being arranged to push said plate toward the friction surface of the front cover in accordance with pressure changes in the space; and
   a damper mechanism including a drive member, a driven member and at least one torsion spring elastically coupling said drive member and said driven member together in a rotating direction, said drive member being arranged to receive a torque from said plate, said driven member being adapted to rotate together with the turbine by first and second engagement portions, said second engagement portion being movably coupled with said first engagement portion in an axial direction but non-rotatably coupled with said first engagement portion in a circumferential direction, said driven member being adapted to be radially supported within the torque converter,
   said first engagement portion being formed of a plurality of first claw portions arranged to be coupled to the turbine and said second engagement portion being formed of a plurality of second claw portions coupled to said driven member, and
   said plate having an inner portion located radially inwardly of said driven member to radially support said plate.

2. The lockup device according to claim 1, wherein said first engagement portion is formed of a plurality of first claw portions adapted to be coupled to the turbine and said second engagement portion is formed of a plurality of second claw portions coupled to said driven member.

3. The lockup device according to claim 2, wherein said driven member is configured to be radially supported by said plurality of first claw portions.

4. The lockup device according to claim 1, wherein said first engagement portion is formed integrally with a turbine shell of the turbine.

5. The lockup device according to claim 4, wherein said first engagement portion is formed as a unitary part of said turbine shell.

6. The lockup device according to claim 4, wherein said driven member is configured to be radially supported by a portion of the turbine.

7. The lockup device according to claim 1, wherein said driven member is configured to be radially supported by said drive member.

8. The lockup device according to claim 1, wherein said driven member is configured to be radially supported by a portion of the turbine.

9. The lockup device according to claim 1, wherein said driven member is configured to be radially supported by said plate.

10. The lockup device according to claim 1, further comprising
   a biasing member adapted to be supported by the front cover, said biasing member being arranged to bias said piston away from the friction surface of the front cover.

11. The lockup device according to claim 1, wherein, said plate is configured to be radially supported by a portion of the turbine.

12. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:
   a plate disposed near the friction surface of the front cover;
   a piston disposed on a side of said plate that faces away from the friction surface of the front cover, said piston being arranged to push said plate toward the friction surface of the front cover in accordance with pressure changes in the space; and
   a damper mechanism including a drive member, a driven member and at least one torsion spring elastically coupling said drive member and said driven member together in a rotating direction, said drive member being arranged to receive a torque from said plate, said driven member being adapted to rotate together with the turbine by first and second engagement portions and said driven member being configured to be radially supported by an inner peripheral portion of said drive member, said second engagement portion being movably coupled with said first engagement portion in an axial direction but non-rotatably coupled with said first engagement portion in a circumferential direction, said driven member being adapted to be radially supported within the torque converter.

13. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:

- a plate disposed near the friction surface of the front cover;
- a piston disposed on a side of said plate that faces away from the friction surface of the front cover, said piston being arranged to push said plate toward the friction surface of the front cover in accordance with pressure changes in the space; and
- a damper mechanism including a drive member, a driven member and at least one torsion spring elastically coupling said drive member and said driven member together in a rotating direction, said drive member being arranged to receive a torque from said plate, said driven member being adapted to rotate together with the turbine by first and second engagement portions, said second engagement portion being movably coupled with said first engagement portion in an axial direction but non-rotatably coupled with said first engagement portion in a circumferential direction, said driven member being adapted to be radially supported within the torque converter, said torsion spring having a portion forming said second engagement portion and said driven member forming said first engagement portion, said driven member being adapted to be fixedly coupled to the turbine.

14. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:

- a plate disposed near the friction surface of the front cover, said plate having a first frictional coupling portion adjacent to the friction surface of the front cover, said first frictional coupling portion being provided with a first friction member coupled to one side and a second friction member coupled to an opposite side, said first friction member having a different radial width than said second friction member;
- a piston disposed on a side of said plate that faces away from the friction surface of the front cover, said piston being arranged to push said plate toward the friction surface of the front cover in accordance with pressure changes in the space; and
- a damper mechanism including a drive member, a driven member and at least one torsion spring elastically coupling said drive member and said driven member together in a rotating direction, said drive member being arranged to receive a torque from said plate, said driven member being adapted to rotate together with the turbine by first and second engagement portions, said second engagement portion being movably coupled with said first engagement portion in an axial direction but non-rotatably coupled with said first engagement portion in a circumferential direction, said driven member being adapted to be radially supported within the torque converter.

15. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:

- a plate disposed near the friction surface of the front cover;
- a piston disposed on a side of said plate that faces away from the friction surface of the front cover, said piston being arranged to push said plate toward the friction surface of the front cover in accordance with pressure changes in the space;
- a damper mechanism including a drive member, a driven member and at least one torsion spring elastically coupling said drive member and said driven member together in a rotating direction, said drive member being arranged to receive a torque from said plate, said driven member being adapted to rotate together with the turbine by first and second engagement portions, said second engagement portion being movably coupled with said first engagement portion in an axial direction but non-rotatably coupled with said first engagement portion in a circumferential direction, said driven member being adapted to be radially supported within the torque converter; and
- a seal ring coupled to one of said plate and said drive member to axially seal opposite sides of an inner peripheral portion of said piston, said piston being radially supported by said one of said plate and said drive member having the seal ring coupled thereto.

16. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:

- a plate disposed near the friction surface of the front cover;
- a piston disposed on a side of said plate that faces away from the friction surface of the front cover, said piston being arranged to push said plate toward the friction surface of the front cover in accordance with pressure changes in the space, said piston having a seal member coupled to an outer portion of said piston, said seal member being adapted to contact the front cover; and
- a damper mechanism including a drive member, a driven member and at least one torsion spring elastically coupling said drive member and said driven member together in a rotating direction, said drive member being arranged to receive a torque from said plate, said driven member being adapted to rotate together with the turbine by first and second engagement portions, said second engagement portion being movably coupled with said first engagement portion in an axial direction but non-rotatably coupled with said first engagement portion in a circumferential direction, said driven member being adapted to be radially supported within the torque converter.

17. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:

- a plate disposed near the friction surface of the front cover;

a piston disposed on a side of said plate that faces away from the friction surface of the front cover, said piston being arranged to push said plate toward the friction surface of the front cover in accordance with pressure changes in the space, said piston having a coupling section that is adapted to be movably coupled to the front cover in an axial direction and non-rotatably coupled to the front cover in a circumferential direction, said piston having an inner diameter larger than an outer diameter of said damper mechanism; and a damper mechanism including a drive member, a driven member and at least one torsion spring elastically coupling said drive member and said driven member together in a rotating direction, said drive member being arranged to receive a torque from said plate, said driven member being adapted to rotate together with the turbine by first and second engagement portions, said second engagement portion being movably coupled with said first engagement portion in an axial direction but non-rotatably coupled with said first engagement portion in a circumferential direction, said driven member being adapted to be radially supported within the torque converter.

18. A lockup device adapted to be used in a torque converter having a front cover with a friction surface on its inner side, an impeller and a turbine, said lockup device being adapted to be disposed in a space between the turbine and the front cover for mechanically engaging and disengaging the front cover to the turbine, said lockup device comprising:

a plate disposed near the friction surface of the front cover;

a piston disposed on a side of said plate that faces away from the friction surface of the front cover, said piston being arranged to push said plate toward the friction surface of the front cover in accordance with pressure changes in the space, said piston having a larger inner diameter than said plate; and a damper mechanism including a drive member, a driven member and at least one torsion spring elastically coupling said drive member and said driven member together in a rotating direction, said drive member being arranged to receive a torque from said plate, said driven member being adapted to rotate together with the turbine by first and second engagement portions, said second engagement portion being movably coupled with said first engagement portion in an axial direction but non-rotatably coupled with said first engagement portion in a circumferential direction, said driven member being adapted to be radially supported within the torque converter.

19. A torque converter adapted to be used to transmit torque from a power input shaft to an output shaft, said torque converter comprising:

a front cover being adapted to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine; and a lockup device disposed in said space for mechanically engaging and disengaging said front cover with respect to said turbine, said lockup device including a plate disposed near said friction surface of said front cover;

a piston disposed on a side of said plate away from said friction surface of said front cover, said piston arranged to push said plate toward said friction surface of said front cover in accordance with pressure changes in said space; and a damper mechanism including a drive member, a driven member and at least one torsion spring elastically coupling said drive member and said driven member together in a rotating direction, said drive member being arranged to receive a torque from said plate, said driven member being arranged to rotate together with said turbine by first and second engagement portions, said second engagement portion being movably coupled with said first engagement portion in an axial direction but non-rotatably coupled with said first engagement portion in a circumferential direction, said driven member being adapted to be radially supported within the torque converter, said first engagement portion being formed of a plurality of first claw portions arranged to be coupled to the turbine, said second engagement portion being formed of a plurality of second claw portions coupled to said driven member, and said plate having and inner portion located radially inwardly of said driven member to radially support said plate.

20. The torque converter according to claim 19, wherein said first engagement portion is formed of plurality of first claw portions coupled to said turbine and said second engagement portion is formed of a plurality of second claw portion coupled to said driven member.

21. The torque converter according to claim 20, wherein said driven member is configured to be radially supported by said plurality of first claw portions.

22. The torque converter according to claim 19, wherein said turbine has a turbine shell and said first engagement portion is formed integrally with said turbine shell.

23. The torque converter according to claim 22, wherein said first engagement portion is formed as a unitary part of said turbine shell.

24. The torque converter according to claim 22, wherein said driven member is configured to be radially supported by a portion of said turbine.

25. The torque converter according to claim 19, wherein said driven member is configured to be radially supported by said drive member.

26. The torque converter according to claim 19, wherein said driven member is configured to be radially supported by a portion of said turbine.

27. The torque converter according to claim 19, wherein said driven member is configured to be radially supported by said plate.

28. The torque converter according to claim 19, further comprising a biasing member supported by said front cover, said biasing member being arranged to bias said piston away from said friction surface of said front cover.

29. The a torque converter according to claim 19, wherein, said plate is configured to be radially supported by a portion of said turbine.

30. A torque converter torque converter adapted to be used to transmit torque from a power input shaft to an output shaft, said torque converter comprising:

a front cover being adapted to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine; and a lockup device disposed in said space for mechanically engaging and disengaging said front cover with respect to said turbine, said lockup device including
  a plate disposed near said friction surface of said front cover;
  a piston disposed on a side of said plate away from said friction surface of said front cover, said piston arranged to push said plate toward said friction surface of said front cover in accordance with pressure changes in said space; and
  a damper mechanism including a drive member, a driven member and at least one torsion spring elastically coupling said drive member and said driven member together in a rotating direction, said drive member being arranged to receive a torque from said plate, said driven member being arranged to rotate together with said turbine by first and second engagement portions, said second engagement portion being movably coupled with said first engagement portion in an axial direction but non-rotatably coupled with said first engagement portion in a circumferential direction, said driven member is being configured within said torque converter to be radially supported by an inner peripheral portion of said drive member.

31. A torque converter adapted to be used to transmit torque from a power input shaft to an output shaft, said torque converter comprising:

a front cover being adapted to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine; and a lockup device disposed in said space for mechanically engaging and disengaging said front cover with respect to said turbine, said lockup device including
  a plate disposed near s aid friction surface of said front cover;
  a piston disposed on a side of said plate away from said friction surface of said front cover, said piston arranged to push said plate toward said friction surface of said front cover in accordance with pressure changes in said space; and
  a damper mechanism including a drive member, a driven member and at least one torsion spring elastically coupling said drive member and said driven member together in a rotating direction, said drive member being arranged to receive a torque from said plate, said driven member being arranged to rotate together with said turbine by first and second engagement portions, said torsion spring having a portion forming said second engagement portion and said driven member forming said first engagement portion, said driven member being fixedly coupled to said turbine, said second engagement portion being movably coupled with said first engagement portion in an axial direction but non-rotatably coupled with said first engagement portion in a circumferential direction, said driven member being arranged to be radially supported within said torque converter.

32. A torque converter adapted to be used to transmit torque from a power input shaft to an output shaft, said torque converter comprising:

a front cover being adapted to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine; and a lockup device disposed in said space for mechanically engaging and disengaging said front cover with respect to said turbine, said lockup device including
  a plate disposed near said friction surface of said front cover, said plate having a first frictional coupling portion adjacent to said friction surface of said front cover, said first frictional coupling portion being provided with a first friction member coupled to one side and a second friction member coupled to an opposite side, said first friction member having a different radial width than said second friction member;
  a piston disposed on a side of said plate away from said friction surface of said front cover, said piston arranged to push said plate toward said friction surface of said front cover in accordance with pressure changes in said space; and
  a damper mechanism including a drive member, a driven member and at least one torsion spring elastically coupling said drive member and said driven member together in a rotating direction, said drive member being arranged to receive a torque from said plate, said driven member being arranged to rotate together with said turbine by first and second engagement portions, said second engagement portion being movably coupled with said first engagement portion in an axial direction but non-rotatably coupled with said first engagement portion in a circumferential direction, said driven member being arranged to be radially supported within said torque converter.

33. A torque converter adapted to be used to transmit torque from a power input shaft to an output shaft, said torque converter comprising:

a front cover being adapted to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine;

a lockup device disposed in said space for mechanically engaging and disengaging said front cover with respect to said turbine, said lockup device including a plate disposed near said friction surface of said front cover;

a piston disposed on a side of said plate away from said friction surface of said front cover, said piston arranged to push said plate toward said friction surface of said front cover in accordance with pressure changes in said space; and a damper mechanism including a drive member, a driven member and at least one torsion spring elastically coupling said drive member and said driven member together in a rotating direction, said drive member being arranged to receive a torque from said plate, said driven member being arranged to rotate together with said turbine by first and second engagement portions, said second engagement portion being movably coupled with said first engagement portion in an axial direction but non-rotatably coupled with said first engagement portion in a circumferential direction, said driven member being arranged to be radially supported within said torque converter; and a seal ring coupled to one of said plate and said drive member to axially seal opposite sides of an inner peripheral portion of said piston, said piston being radially supported by said one of said plate and said drive member having the seal ring coupled thereto.

34. A torque converter adapted to be used to transmit torque from a power input shaft to an output shaft, said torque converter comprising:

a front cover being adapted to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine; and a lockup device disposed in said space for mechanically engaging and disengaging said front cover with respect to said turbine, said lockup device including a plate disposed near said friction surface of said front cover;

a piston disposed on a side of said plate away from said friction surface of said front cover, said piston arranged to push said plate toward said friction surface of said front cover in accordance with pressure changes in said space, said piston having a seal member coupled to an outer portion of said piston, said seal member being arranged to contact said front cover; and a damper mechanism including a drive member, a driven member and at least one torsion spring elastically coupling said drive member and said driven member together in a rotating direction, said drive member being arranged to receive a torque from said plate, said driven member being arranged to rotate together with said turbine by first and second engagement portions, said second engagement portion being movably coupled with said first engagement portion in an axial direction but non-rotatably coupled with said first engagement portion in a circumferential direction, said driven member being arranged to be radially supported within said torque converter.

35. A torque converter adapted to be used to transmit torque from a power input shaft to an output shaft, said torque converter comprising:

a front cover being adapted to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine;

a lockup device disposed in said space for mechanically engaging and disengaging said front cover with respect to said turbine, said lockup device including a plate disposed near said friction surface of said front cover;

a piston disposed on a side of said plate away from said friction surface of said front cover, said piston arranged to push said plate toward said friction surface of said front cover in accordance with pressure changes in said space; and a damper mechanism including a drive member, a driven member and at least one torsion spring elastically coupling said drive member and said driven member together in a rotating direction, said drive member being arranged to receive a torque from said plate, said driven member being arranged to rotate together with said turbine by first and second engagement portions, said second engagement portion being movably coupled with said first engagement portion in an axial direction but non-rotatably coupled with said first engagement portion in a circumferential direction, said driven member being arranged to be radially supported within said torque converter; and said piston having a coupling section that is movably coupled to said front cover in an axial direction and non-rotatably coupled to said front cover in a circumferential direction, said piston having an inner diameter larger than an outer diameter of said damper mechanism.

36. A torque converter adapted to be used to transmit torque from a power input shaft to an output shaft, said torque converter comprising:

a front cover being adapted to be coupled to the power input shaft, said front cover being provided at an inner side with a friction surface;

an impeller connected to said front cover to form a hydraulic chamber together with said front cover;

a turbine disposed opposite said impeller and disposed inside said hydraulic chamber, said turbine being adapted to be coupled to the output shaft, said front cover and said turbine forming a space therebetween;

a stator disposed between said impeller and said turbine; and a lockup device disposed in said space for mechanically engaging and disengaging said front cover with respect to said turbine, said lockup device including
   a plate disposed near said friction surface of said front cover;
   a piston disposed on a side of said plate away from said friction surface of said front cover, said piston arranged to push said plate toward said friction surface of said front cover in accordance with pressure changes in said space, said piston having a larger inner diameter than said plate; and
a damper mechanism including a drive member, a driven member and at least one torsion spring elastically coupling said drive member and said driven member together in a rotating direction, said drive member being arranged to receive a torque from said plate, said driven member being arranged to rotate together with said turbine by first and second engagement portions, said second engagement portion being movably coupled with said first engagement portion in an axial direction but non-rotatably coupled with said first engagement portion in a circumferential direction, said driven member being arranged to be radially supported within said torque converter.

\* \* \* \* \*